(12) United States Patent
Fink

(10) Patent No.: US 7,104,288 B2
(45) Date of Patent: Sep. 12, 2006

(54) INFLATOR FOR VEHICLE PROTECTION APPARATUS

(75) Inventor: Michael Fink, Mesa, AZ (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/237,488

(22) Filed: Sep. 27, 2005

(65) Prior Publication Data

US 2006/0037662 A1 Feb. 23, 2006

Related U.S. Application Data

(60) Continuation of application No. 10/815,298, filed on Mar. 31, 2004, which is a continuation of application No. 10/364,117, filed on Feb. 10, 2003, now Pat. No. 6,719,016, which is a division of application No. 09/632,339, filed on Aug. 3, 2000, now Pat. No. 6,543,806.

(51) Int. Cl.
*B65B 1/04* (2006.01)
(52) U.S. Cl. .............. 141/10; 141/47; 141/54; 141/100; 141/114; 280/741
(58) Field of Classification Search .............. 141/10, 141/44, 47, 54, 100, 114, 192, 197, 313, 317; 280/728.1, 734, 737, 741, 742
See application file for complete search history.

(56) References Cited

U.S. PATENT DOCUMENTS

| 3,961,806 A | 6/1976 | Katter |
| 5,464,247 A | 11/1995 | Rizzi et al. |
| 5,542,702 A | 8/1996 | Green et al. |
| 5,582,428 A | 12/1996 | Buchanan et al. |
| 5,584,505 A | 12/1996 | O'Loughlin et al. |
| 5,630,619 A | 5/1997 | Buchanan et al. |
| 5,642,903 A | 7/1997 | Headley |
| 5,669,629 A * | 9/1997 | Rink .............. 280/741 |
| 5,711,547 A | 1/1998 | Blumenthal et al. |
| 5,720,495 A | 2/1998 | Faigle et al. |
| 5,782,486 A | 7/1998 | Barnes et al. |
| 5,799,972 A | 9/1998 | Handman et al. |
| 5,803,493 A | 9/1998 | Paxton et al. |
| 5,820,162 A | 10/1998 | Fink |
| 5,893,583 A | 4/1999 | Blumenthal et al. |
| 6,010,152 A | 1/2000 | Swann et al. |
| 6,029,995 A | 2/2000 | Fink |
| 6,412,811 B1 | 7/2002 | Campbell et al. |
| 6,543,806 B1 | 4/2003 | Fink |

FOREIGN PATENT DOCUMENTS

| DE | 42 24 927 A1 | 2/1994 |
| DE | 44 10 574 A1 | 10/1994 |
| GB | 2 316 475 A | 2/1998 |

* cited by examiner

*Primary Examiner*—Timothy L. Maust
(74) *Attorney, Agent, or Firm*—Jimmy L. Funke

(57) ABSTRACT

A pressurized container includes a vessel defining a chamber therein. A housing that is connected to the vessel defines an outlet that is fluidly separated from the chamber by a closure member. A moveable member may be seated within and form a seal with the housing and abut the closure member. Activation of an initiator propels the moveable member through the closure member, thereby fluidly connecting the chamber and the outlet. Also, the chamber might include a first portion and a second portion, wherein an isolator member substantially fluidly separates the first portion and the second portion. Gas released from the first portion initially inflates an air bag associated with the pressurized container and gas released from the second portion maintains the inflation of the air bag for a time.

40 Claims, 12 Drawing Sheets

INFLATOR FOR VEHICLE PROTECTION APPARATUS

CROSS REFERENCE TO RELATED APPLICATIONS

This application is a continuation of the earlier U.S. Utility patent application to Michael Fink entitled "INFLATOR FOR VEHICLE PROTECTION APPARATUS," Ser. No. 10/815,298, filed Mar. 31, 2004, which is a continuation of U.S. patent application Ser. No. 10/364,117, filed on Feb. 10, 2003, now U.S. Pat. No. 6,719,016, entitled "INFLATOR FOR VEHICLE PROTECTION APPARATUS", which is a divisional of U.S. patent application Ser. No. 09/632,339, filed on Aug. 3, 2000 now U.S. Pat. No. 6,543,806, entitled "INFLATOR FOR VEHICLE PROTECTION APPARATUS", the disclosures of all of which are hereby incorporated entirely herein by reference.

BACKGROUND

1. Technical Field

This invention generally relates to pressurized containers, and more specifically relates to an inflator for a vehicle protection apparatus.

2. Background Art

Inflatable vehicle restraints such as air bags are used for protecting vehicle occupants during collisions. When the vehicle undergoes a collision a sensor detects the rapid change in motion and provides an electrical signal to activate an inflator, which rapidly expands an air bag to provide a protective cushion of restraint for an occupant in various impact conditions.

Many types of inflators have been disclosed in the art for inflating an inflatable restraint system. One type utilizes a stored compressed gas, which is released to inflate the restraint system. Another type utilizes a combustible gas generating material, such as sodium azide, which upon ignition generates a quantity of hot gas to inflate the restraint. In yet another type, a combination of a compressed stored gas and a combustible material are both used to inflate the restraint. Inflators using combustible gas are often considered unsafe because of the heat that they generate. However, compressed gas inflators have often been unreliable or they have released compressed gas at an excessive rate that causes air bags to injure vehicle occupants.

SUMMARY

Therefore, there existed a need to provide a reliable inflator that will inflate a vehicle restraint without generating excess heat. The present invention provides a pressurized container that includes a hollow vessel defining a chamber therein. A housing that is connected to the vessel defines an outlet that is fluidly separated from the chamber by a closure member. A moveable member is seated within and forms a seal with the housing and abuts the closure member. When an initiator is activated, a charge within the initiator is ignited to produce expanding gases that burst a body of the initiator and propel the moveable member through the closure member, thereby fluidly connecting the chamber and the outlet. The moveable member may break through the closure member before the seal with the housing is broken so that the moveable member acts like a piston.

A pressurized container might include an obstruction partially blocking an outlet path and another initiator that breaks the obstruction when activated, thereby further opening the outlet path.

Also, the chamber might include a first portion and a second portion, wherein an isolator member substantially fluidly separates the first portion and the second portion. A passage fluidly connects the first portion of the chamber and the second portion of the chamber. This dual chamber configuration might be useful where it is desirable to keep a device inflated over a period of time.

The pressurized container might include a main path fluidly connected to the outlet, a first secondary path that connects the main path to the chamber, and a second secondary path that also connects the main path to the chamber. If the pressurized container includes two secondary paths, a first closure member can fluidly separate the outlet from the chamber of the vessel along the first secondary path, and a second closure member can fluidly separate the outlet from the chamber of the vessel along the second secondary path. Activation of a first initiator breaks the first closure member, thereby fluidly connecting the chamber and the outlet along the first secondary path and the main path, and activation of a second initiator breaks the second closure member, thereby fluidly connecting the chamber and the outlet along the second secondary path and the main path. If the pressurized container includes either the first and second secondary paths as described, or the pressurized container includes the obstruction to the outlet path, an initial flow is minimal, and when the obstruction is removed or the second secondary outlet path is opened, then the flow of pressurized gas is increased. In this way, the initial force of an inflatable device such as an air bag is minimized during the initial flow stage, but the flow is substantially increased during the latter flow stage so that the device is rapidly inflated.

The present invention also provides a pressurized container that includes a hollow vessel defining a chamber and a housing connected to the vessel that defines an outlet. The outlet is fluidly separated from the chamber by a closure member, so that activation of an initiator breaks the closure member, thereby fluidly connecting the chamber and the outlet. The vessel and the closure member may be a single unitary member so that the closure member, the vessel, and a plug in the vessel form a sealed barrier around the chamber. Also, the housing and the closure member may be a single unitary member, wherein the housing is inertia welded to the vessel to form the chamber. Having the barrier around the chamber be formed by unitary members provides superior prevention against leakage of compressed gas from the chamber during storage.

The present invention also provides a method of releasing a pressurized fluid from a container. The method includes the steps of breaking a closure member that fluidly separates the pressurized fluid from an outlet of the container, thereby allowing the fluid to escape to the outlet along an outlet path, and breaking an obstruction that is partially blocking the outlet path, thereby further opening the outlet path.

The foregoing and other features and advantages of the invention will be apparent from the following more particular description of preferred embodiments of the invention, as illustrated in the accompanying drawings.

BRIEF DESCRIPTION OF THE DRAWINGS

The preferred embodiments of the present invention will hereinafter be described in conjunction with the appended drawings, where like designations denote like elements.

DESCRIPTION

Figure 1:
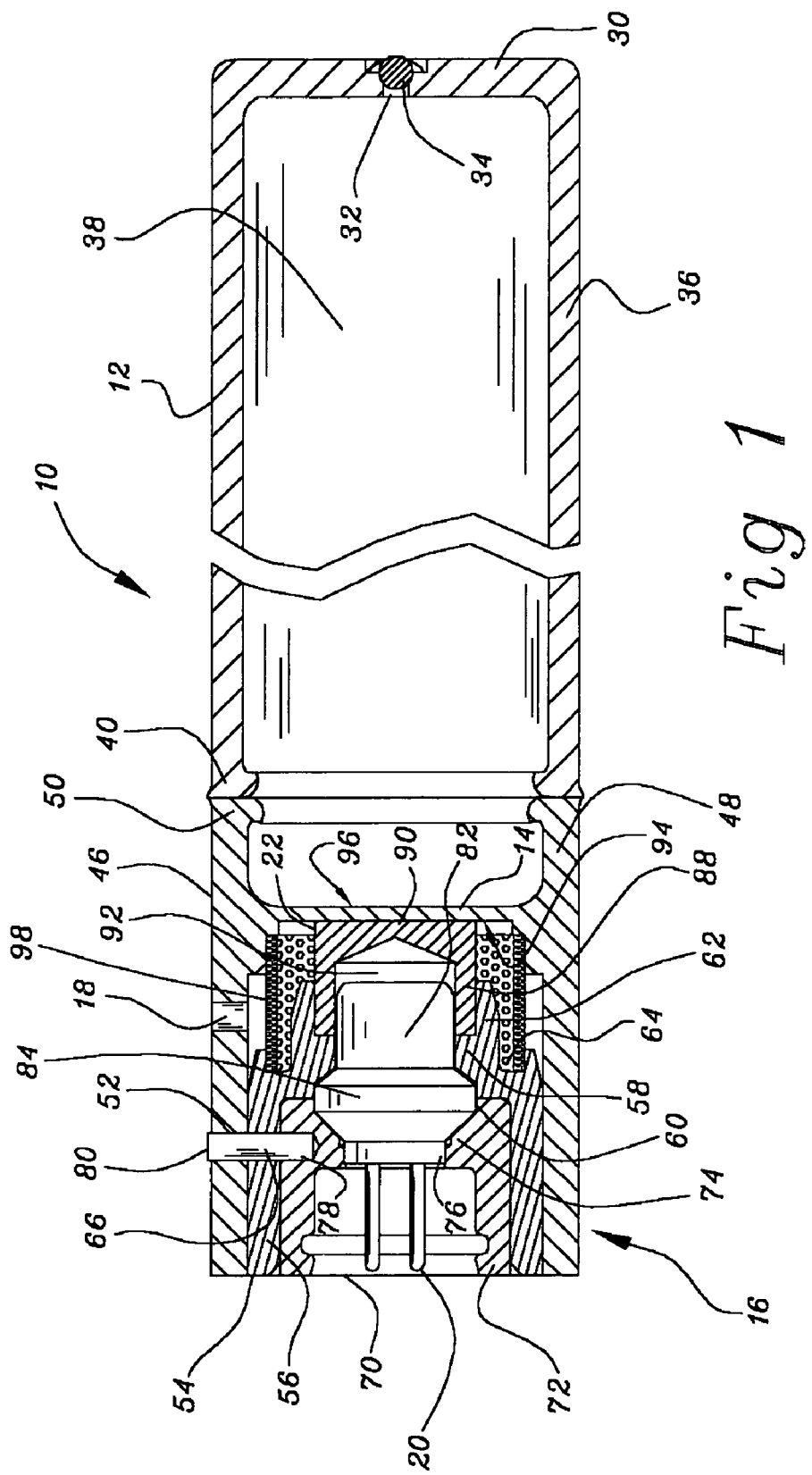
FIG. 1 is a partial sectional view of an embodiment of the present invention in an unactivated condition.
Figure 2:
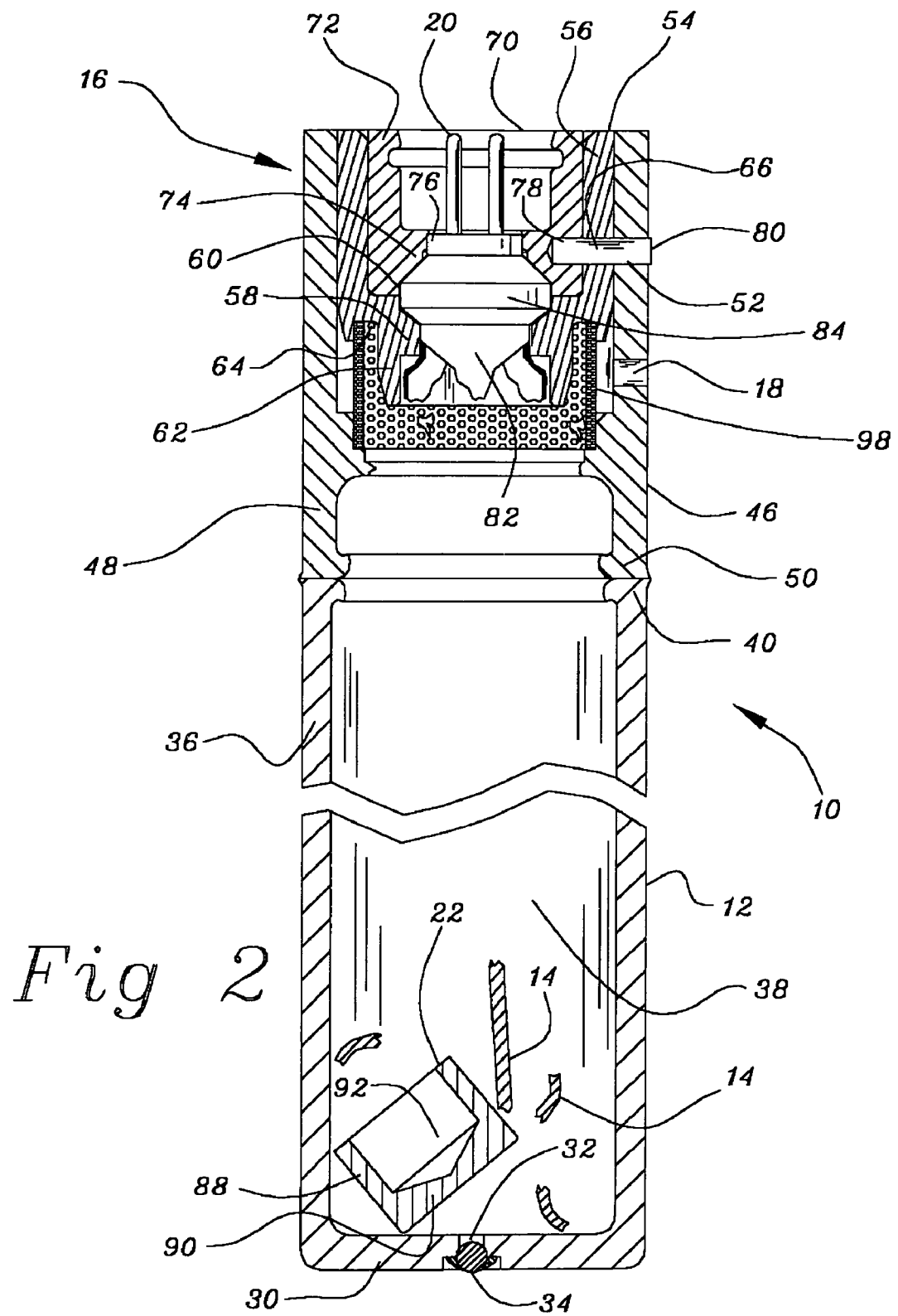
FIG. 2 is a partial sectional view of the embodiment of FIG. 1 in an activated condition.

Referring to FIG. 1, a pressurized container or inflator 10 generally includes a vessel 12 that houses compressed gas, such as helium. A closure member 14 forms a closure of the vessel 12. A housing 16 is attached to vessel 12 and defines an outlet 18 therein that is preferably fluidly separated from the compressed gas only by closure member 14. Housing 16 houses an initiator 20 and a moveable member or projectile 22 that abuts closure member 14 on a side opposite from the compressed gas. Referring now to FIG. 2, when initiator 20 is activated, initiator 20 propels projectile 22 through closure member 14, out of housing 16, and into vessel 12, thereby breaking closure member 14 and allowing the compressed gas to escape through outlet 18 and inflate a vehicle restraint such as an air bag (not shown). Also, gas could escape through multiple outlets to inflate the vehicle restraint.

Referring back to FIG. 1, and describing inflator 10 in more detail, vessel 12 is preferably a hollow cylindrical member that includes a radial wall 30 that defines a fill hole 32 therein. A weld ball 34 preferably forms a closure or plug of fill hole 32. However, fill hole 32 may be closed or plugged in some other fashion that allows vessel 12 to be filled with pressurized gas and sealed. A circumferential wall 36 extends upwardly from radial wall 30 to define a chamber 38 therein (directional terms such as bottom, top, upwardly, and downwardly are used herein for convenience in referring to the drawings and the inflator may be oriented in any of several positions when in use). An upper terminus 40 of circumferential wall 36 extends inwardly to form an annular flange distal from radial wall 30.

Housing 16 preferably includes an end cap housing 46 that is primarily a circumferential wall 48 that includes a lower terminus 50 that extends inwardly to form an annular flange that abuts upper terminus 40 of vessel 12. Preferably lower terminus 50 abuts upper terminus 40 and is secured thereto by an inertia weld or a friction weld thereby securing vessel 12 to housing 16. Accordingly, chamber 38 extends upwardly within the lower portion of housing 16. However, vessel 12 may be secured to housing 16 in many other ways so long as chamber 38 remains sealed. End cap housing 46 preferably defines an outlet or outlet orifice 18 that extends radially therethrough. End cap housing 46 also defines a pin hole 52.

A projectile housing 54 preferably includes an upper circumferential wall 56 that is seated within circumferential wall 48 of end cap housing 46. A radial wall 58 preferably extends inwardly from a lower terminus of circumferential wall 56 and defines a beveled hole 60 therein. A projectile casing 62 is preferably a circumferential wall that extends from radial wall 58. Projectile housing 54 also defines a downwardly-facing annular groove 64 and a radially extending pin hole 66.

An initiator retainer 70 is seated within upper circumferential wall 56 of projectile housing 54. Initiator retainer 70 includes a circumferential wall 72 and a radial wall 74 extending inwardly from a bottom edge of circumferential wall 72. Radial wall 74 defines a centrally located beveled hole 76 therein. Initiator retainer 70 defines a radially extending pin hole 78 therein.

A pin 80 extends through pin hole 52 of end cap housing 46, through pin hole 66 of projectile housing 54 and into pin hole 78 of initiator retainer 70. Preferably pin 80 is sized to produce an interference fit with one or more of pin holes 52, 66, 78.

Initiator 20 is preferably a standard initiator that includes a small pyrotechnic charge housed within a cylindrical body 82. A flange 84 extends radially outwardly from an upper portion of cylindrical body 82. Flange 84 is seated within beveled hole 60 of projectile housing 54 and beveled hole 76 of initiator retainer 70 to secure initiator 20 within housing 16. Initiator 20 is preferably an initiator of the kind known as "popcorn" or pin style initiators that includes zirconium potassium perchlorate as a pyrotechnic material and that includes a bridge wire that ignites the pyrotechnic material when a current is passed through it.

Projectile 22 preferably includes a circumferential wall 88 that is seated within casing 62. However, the casing and the projectile may be some other structure. For example, the casing may extend within the circumferential wall of the projectile. A radial wall 90 extends inwardly from a bottom edge of circumferential wall 88 so that projectile 22 forms an upwardly facing cavity 92 that receives body 82 of initiator 20. Also, some moveable member may be used that is not a projectile (by "projectile" is meant a moveable member that is propelled freely away from the casing). For example, the moveable member's motion may be stopped after it has been propelled through the closure member, but before it has left the casing.

Closure member 14 is preferably a radial wall or plate having an upwardly facing first side 94 and a downwardly facing second side 96. Closure member 14 extends inwardly from end cap housing 46 and is preferably formed with end cap housing 46 as a unitary member. Radial wall 90 of projectile 22 preferably abuts first side 94 to support closure member 14 against the force of pressurized gas within chamber 38. This allows closure member 14 to be thin and it still provides the structural integrity needed to keep the pressurized gas from prematurely breaking closure member 14.

An annular filter 98 is seated within annular groove 64 of projectile housing 54 and extends downwardly until it abuts a shoulder of end cap housing 46.

Vessel 12 is preferably made from an aluminum alloy such as 7075-T6 aluminum. Preferably, vessel 12 is manufactured and treated by a cold impact process, which will produce sufficient strength to withstand high pressures from within chamber 38. Further, the cold impact process aligns the grain structure of the aluminum so that leakage of gas is prevented.

End cap housing 46 and closure member 14 are preferably a unitary member made from 7075-T6 aluminum. End cap housing 46 and closure member 14 are preferably cold impacted, although they may be hot forged. Hot forging, as with the cold impact process, produces a part with good strength and grain alignment properties. Hot forging may be desirable to produce members having more complex structures.

Projectile housing 54, initiator retainer 70, and projectile 22 are preferably all made from stainless steel or high strength aluminum, and are preferably manufactured using a screw machine. These members need not have the high degree of grain alignment needed for vessel 12, end cap housing 46, and closure member 14. However, they should be made of a material that has good strength and corrosion-resistance properties. Additionally, projectile 22 is preferably made from stainless steel or high strength aluminum so that it can resist heat and pressure produced by initiator 20 when initiator 20 is activated.

In assembling inflator 10, lower terminus 50 of end cap housing 46 is welded to upper terminus 40 of vessel 12. This weld is preferably an inertia weld or a friction weld because such a welds are resistant to leakage. The inertia or friction weld creates the inwardly extending annular flanges of lower terminus 50 of end cap housing 46 and the upper terminus 40 of vessel 12.

Then, an initiator assembly is formed by first pressing projectile 22 into casing 62 of projectile housing 54 to preferably form an interference fit. Initiator 20 is then inserted into beveled hole 60 of projectile housing 54 so that flange 84 is seated within the beveled portion of hole 60, and body 82 extends through hole 60 and into cavity 92 of projectile 20. Initiator retainer 70 is then pressed within circumferential wall 56 of projectile housing 54. Preferably, initiator retainer 70 and projectile housing 54 form an interference fit. Filter 98 is then positioned in annular groove 64 of projectile housing 54.

The resulting initiator assembly is then preferably pressed within circumferential wall 48 of end cap housing 46 until radial wall 90 of projectile 22 abuts closure member 14. Pin holes 52, 66, and 78 are preferably then drilled so that they all align. Pin 80 is preferably then pressed into pin holes 52, 66, and 78 to fix end cap housing 46, projectile housing 54, and initiator retainer 70 of housing 16 together.

Chamber 38 is preferably then filled with a pressurized gas through fill hole 32 in vessel 12. The gas is preferably helium, but it may be any of several other types of gas or mixtures of gases. After chamber 38 is filled, weld ball 34 is positioned in fill hole 32 and is welded therein preferably by a resistance weld. Inflator 10 is then positioned within a module and outlet 18 is fluidly connected to an inflatable safety device such as an air bag. Initiator 20 is connected to the control for the safety device so that initiator 20 will be timely activated by the control for the safety device.

Referring to FIG. 2, when initiator 20 is activated, the charge within body 82 is ignited, thereby producing expanding gases. The expanding gases burst body 82 and creates pressure within cavity 92, which propels projectile 22 through closure member 14. Preferably, circumferential wall 88 of projectile 22 remains within casing 62 so that projectile 22 acts as a piston until projectile 22 breaks through closure member 14. Projectile 22 and fragments from closure member 14 and body 82 are propelled into chamber 38. With closure member 14 broken, pressurized gas within chamber 38 is allowed to escape along an outlet path through filter 98 and through outlet 18. The gas will then inflate the inflatable safety device. Filter 98 prevents projectile 22 and fragments from closure member 14 and body 82 from escaping through outlet 18.

Figure 3:
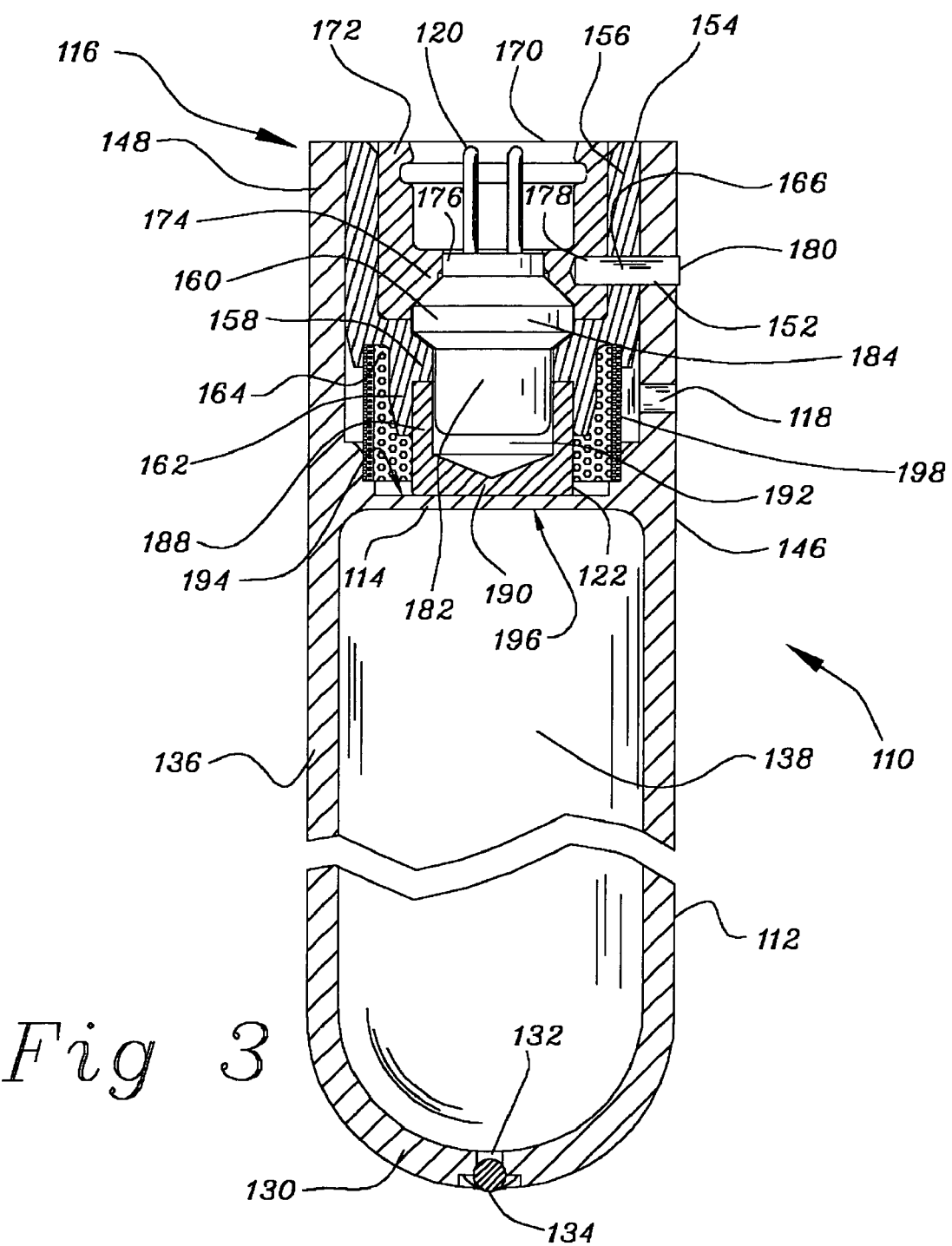
FIG. 3 is a partial sectional view of an embodiment of the present invention in an unactivated condition.

Referring now to FIG. 3, an alternative inflator 110 is shown, wherein the last two digits of reference numbers for features that correspond to features discussed above with reference to FIGS. 1–2 have the same last two digits. Vessel 112, closure member 114, and end cap housing 146 are all part of a unitary member. Also, rather than a radial wall, vessel 112 includes a necked closed formed end 130 that is preferably formed by either secondary necking or roll forming. Inflator 110 is advantageous in that the only welded closure of chamber 138 is the fill hole 132 that is filled by weld ball 134. Thus, the likelihood of leakage through a welded joint is decreased. Otherwise, the embodiment shown in FIG. 3 is the same as the embodiment of FIGS. 1 and 2 in structure and function.

Figure 4:
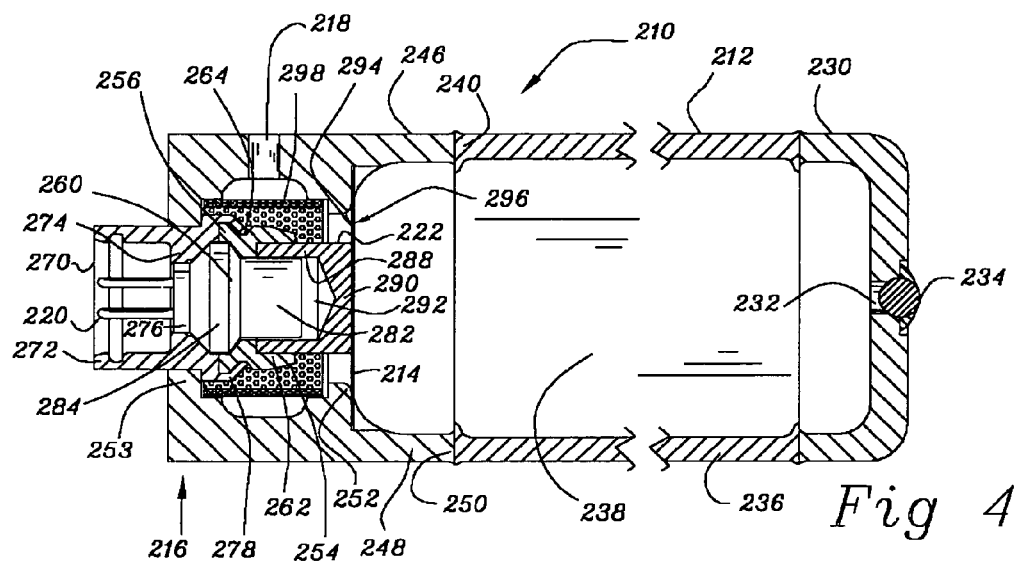
FIG. 4 is a partial sectional view of an embodiment of the present invention in an unactivated condition.
Figure 5:
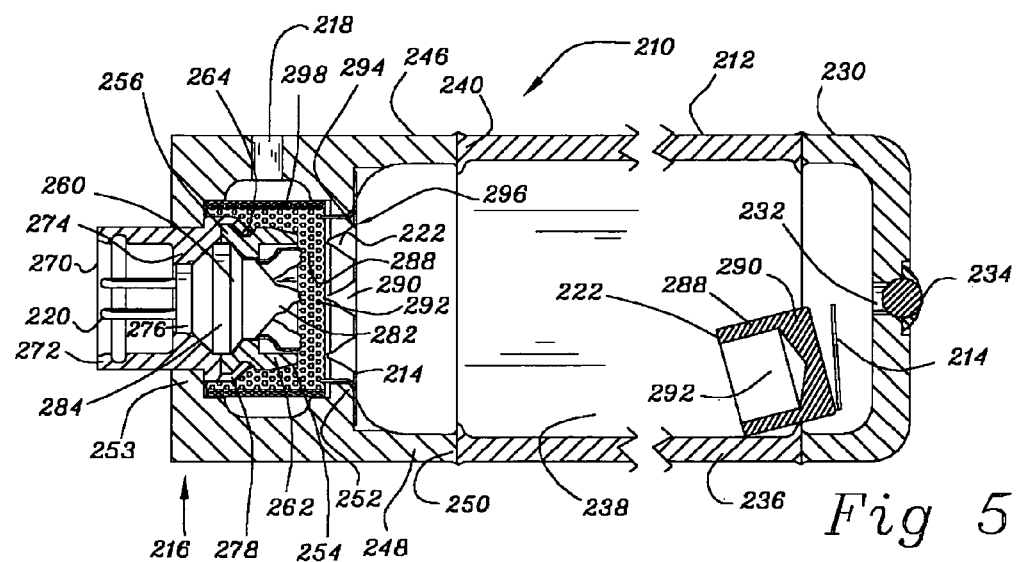
FIG. 5 is a partial sectional view of the embodiment of FIG. 4 in an activated condition.

Referring now to FIG. 4, an alternative pressurized container or inflator 210 generally includes a vessel 212 that houses compressed gas, such as helium. A closure member 214 forms a closure of vessel 212. A housing 216 is attached to vessel 212 and defines an outlet 218 therein that is preferably fluidly separated from the compressed gas only by closure member 214. Housing 216 houses an initiator 220 and a projectile 222 that abuts closure member 214 on a side opposite from the compressed gas. Referring now to FIG. 5, when initiator 220 is activated, initiator 220 propels projectile 222 through closure member 214, out of housing 216, and into vessel 212, thereby breaking closure member 214 and allowing the compressed gas to escape through outlet 218 and inflate a vehicle restraint such as an air bag (not shown).

Referring back to FIG. 4, and describing inflator 210 in more detail, vessel 212 is preferably a hollow cylindrical member that includes a bottom end cap 230 including a radial wall that defines a fill hole 232 therein. A weld ball 234 preferably forms a closure or plug of fill hole 232. However, fill hole 232 may be closed or plugged in some other fashion that allows vessel 212 to be filled with pressurized gas and then sealed. A circumferential wall 236 extends upwardly from bottom end cap 230 to define a chamber 238 therein. An upper terminus 240 of circumferential wall 236 extends inwardly to form an annular flange distal from bottom end cap 230.

Housing 216 preferably includes an end cap housing 246 that is primarily a circumferential wall 248 that includes a lower terminus 250 that extends inwardly to form an annular flange that abuts upper terminus 240 of vessel 212. Preferably lower terminus 250 abuts upper terminus 240 and is secured thereto by an inertia or friction weld thereby securing vessel 212 to housing 216. Accordingly, chamber 238 extends upwardly within the lower portion of housing 216. However, vessel 212 may be secured to housing 216 in many other ways so long as chamber 238 remains sealed. End cap housing 246 preferably defines an outlet or outlet orifice 218 that extends radially therethrough. End cap housing 246 also includes a lower rib 252 that extends radially inwardly from circumferential wall 248 and an upper rib 253 that extends radially inwardly from circumferential wall 248.

A projectile housing 254 preferably includes a circumferential wall 256. Circumferential wall 256 defines a beveled hole 260 therein, and a lower portion of circumferential wall 256 forms a casing 262. Circumferential wall 256 also defines an outwardly-facing annular groove 264.

An initiator retainer 270 is seated within upper rib 253 of end cap housing 246. Initiator retainer 270 includes an upper circumferential wall 272 and a radial wall 274 extending inwardly from a bottom edge of upper circumferential wall 272. Radial wall 274 defines a centrally located beveled hole 276 therein. Initiator retainer 270 also defines a lower circumferential wall 278 that is crimped to engage annular groove 264, thereby securing projectile housing 254 to initiator retainer 270. This crimped design may be used instead of the design shown above in FIGS. 1–2. In fact, the crimped design is advantageous in many embodiments because the whole initiator assembly may be secured before it is input into the end cap housing.

Initiator 220 is preferably a standard initiator that includes a small pyrotechnic charge housed within a cylindrical body 282. A flange 284 extends radially outwardly from an upper portion of cylindrical body 282. Flange 284 is seated within beveled hole 260 of projectile housing 254 and beveled hole 276 of initiator retainer 270 to secure initiator 220 within housing 216. Initiator 220 is preferably an initiator of the kind known as "popcorn" or pin style initiators that includes zirconium potassium perchlorate as a pyrotechnic material and that includes a bridge wire that ignites the pyrotechnic material when a current is passed through it.

Projectile 222 preferably includes a circumferential wall 288 that is seated within casing 262. A radial wall 290 extends inwardly from a bottom edge of circumferential wall 288 so that projectile 222 forms an upwardly facing cavity 292 that receives body 282 of initiator 220.

Closure member 214 is a radial wall having an upwardly facing first side 294 and a downwardly facing second side 296. In this embodiment, closure member 214 is a stainless steel disc that is welded to the bottom surface of lower rib 252 of end cap housing 246. Radial wall 290 of projectile 222 preferably abuts first side 294 to support closure member 214 against the force of pressurized gas within chamber 238. This allows closure member 214 to be thin and it still provides the structural integrity needed to keep the pressurized gas from prematurely breaking closure member 214.

An annular filter 298 is seated within projectile housing 254 and extends between upper rib 253 and lower rib 252.

Projectile housing 254 and initiator retainer 270 are preferably made from steel with a screw machine. End cap housing 246 is preferably made from steel by a cold impact process. Circumferential wall 236 of vessel 212 is preferably steel tubing, and bottom end cap 230 of vessel 212 is preferably a drawn steel cup. Closure member 214 is preferably made from stainless steel.

In assembling inflator 210, an initiator assembly is formed by first pressing projectile 222 into casing 262 of projectile housing 254 to preferably form an interference fit. Initiator 220 is then inserted into beveled hole 260 of projectile housing 254 so that flange 284 is seated within the beveled portion of hole 260 and body 282 extends through hole 260 and into cavity 292 of projectile 220. Initiator retainer 270 is then pressed so that lower circumferential wall 278 receives circumferential wall 256 of projectile housing 254. Lower circumferential wall 278 is then crimped to engage annular groove 264 thereby securing projectile housing 254 to initiator retainer 270.

The resulting initiator assembly is then preferably pressed within upper rib 253 of end cap housing 246. Filter 298 is positioned within end cap housing 246. Closure member 214 is preferably then welded to lower rib 252 of end cap housing 246 by a laser weld. Bottom end cap 230 is then welded to circumferential wall 236 distal from end cap housing 246, preferably by an inertia or friction weld.

Lower terminus 250 of end cap housing 246 is welded to upper terminus 240 of vessel 212. This weld is preferably an inertia or friction weld because such welds are resistant to leakage.

Chamber 238 is preferably then filled with a pressurized gas through fill hole 232 in vessel 212. The gas is preferably helium, but it may be any of several other types of gas. After chamber 238 is filled, weld ball 234 is positioned in fill hole 232 and is welded therein preferably by a resistance weld. Inflator 210 is then positioned within a module and outlet 218 is fluidly connected to an inflatable safety device such as an air bag. Initiator 220 is connected to the control for the safety device so that initiator 220 will be timely activated by the control for the safety device.

Referring to FIG. 5, when initiator 220 is activated, body 282 bursts and propels projectile 222 through closure member 214. Preferably, circumferential wall 288 of projectile 222 remains within casing 262 so that projectile 222 acts as a piston until projectile 222 breaks through closure member 214. Projectile 222 and fragments from closure member 214 and body 282 are propelled into chamber 238. With closure member 214 broken, pressurized gas within chamber 238 is allowed to escape along an outlet path through filter 298 and through outlet 218. The gas will then inflate the inflatable safety device. Filter 298 prevents projectile 222 and fragments from closure member 214 and body 282 from escaping through outlet 218.

Figure 6:
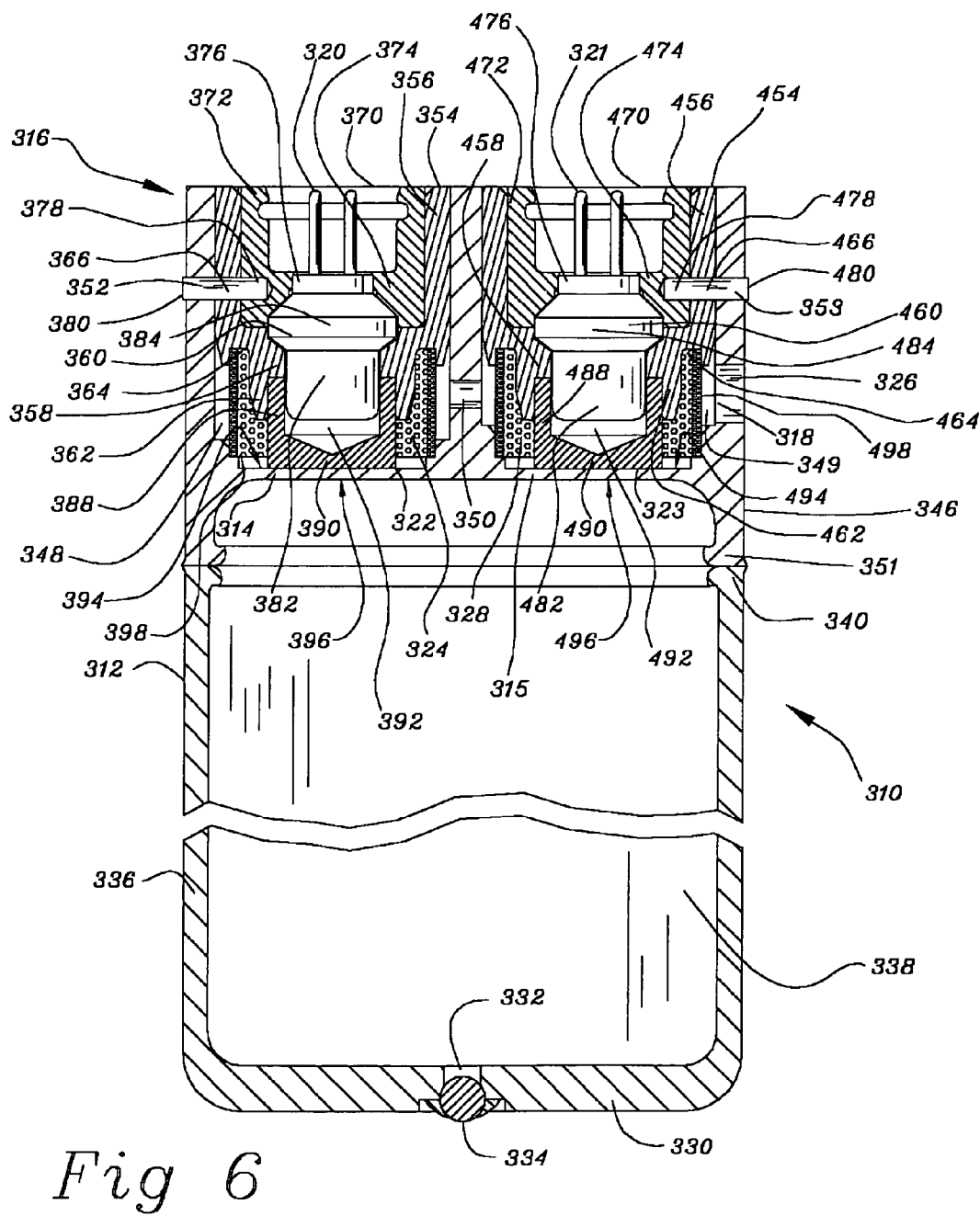
FIG. 6 is a partial sectional view of an embodiment of the present invention in an unactivated condition.

Referring now to FIG. 6, a pressurized container or inflator 310 generally includes a vessel 312 that houses compressed gas, such as helium. A first closure member 314 and a second closure member 315 form a closure of vessel 312. A housing 316 is attached to vessel 312 and defines an outlet 318 therein that is preferably fluidly separated from the compressed gas only by closure members 314, 315. Housing 316 houses a first initiator 320, a second initiator 321, a first projectile 322 that abuts first closure member 314 on a side opposite from the compressed gas, and a second projectile 323 that abuts second closure member 315 on a side opposite from the compressed gas.

Figure 7:
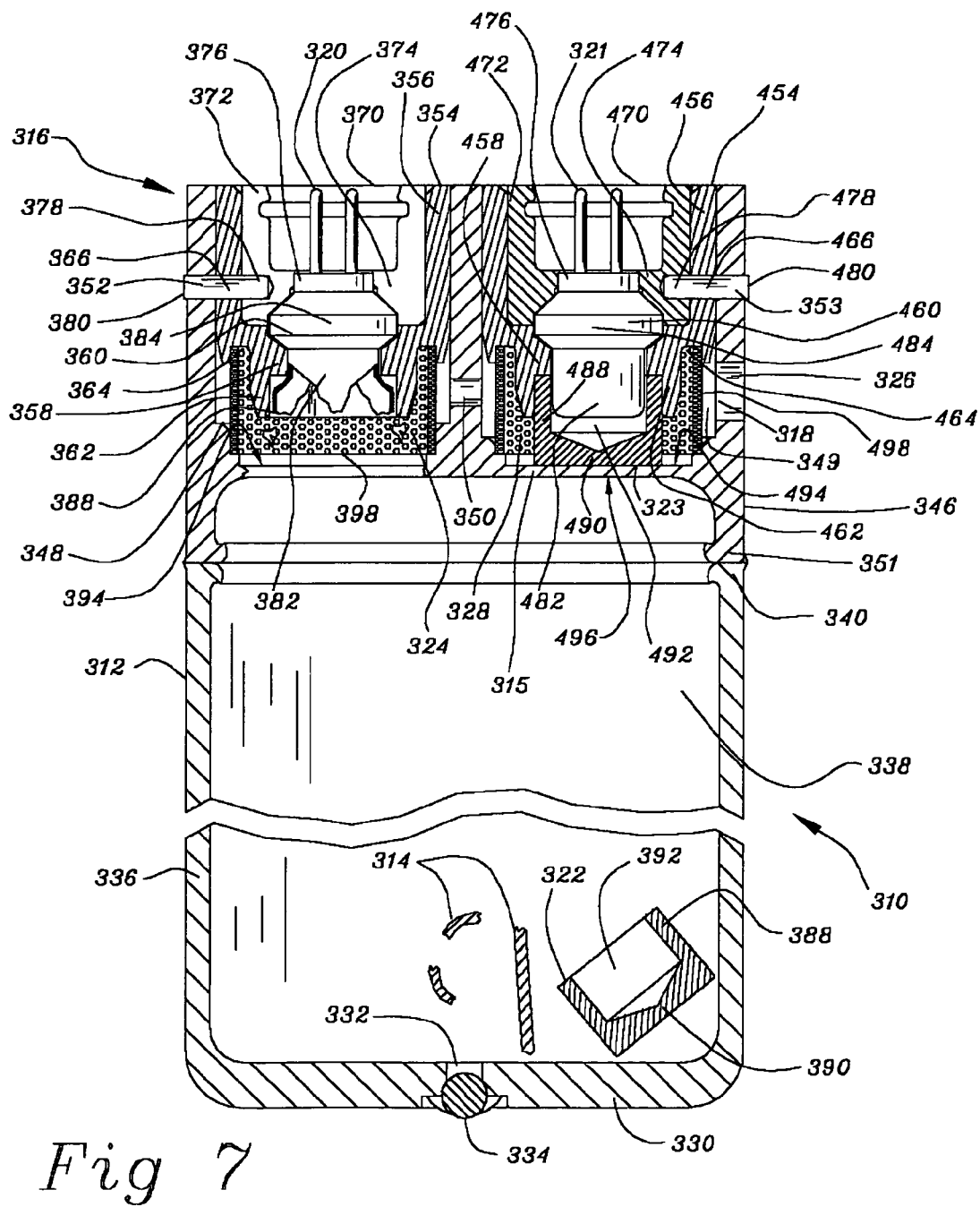
FIG. 7 is a partial sectional view of the embodiment of FIG. 6 in an initial flow stage condition.

Referring now to FIG. 7, when first initiator 320 is activated, first initiator 320 propels first projectile 322 through first closure member 314, out of housing 316, and into vessel 312, thereby breaking first closure member 314 and allowing the compressed gas to escape through a first secondary outlet path 324, through a main outlet path 326, and though outlet 318. The compressed gas begins to inflate a vehicle restraint such as an air bag (not shown).

Figure 8:
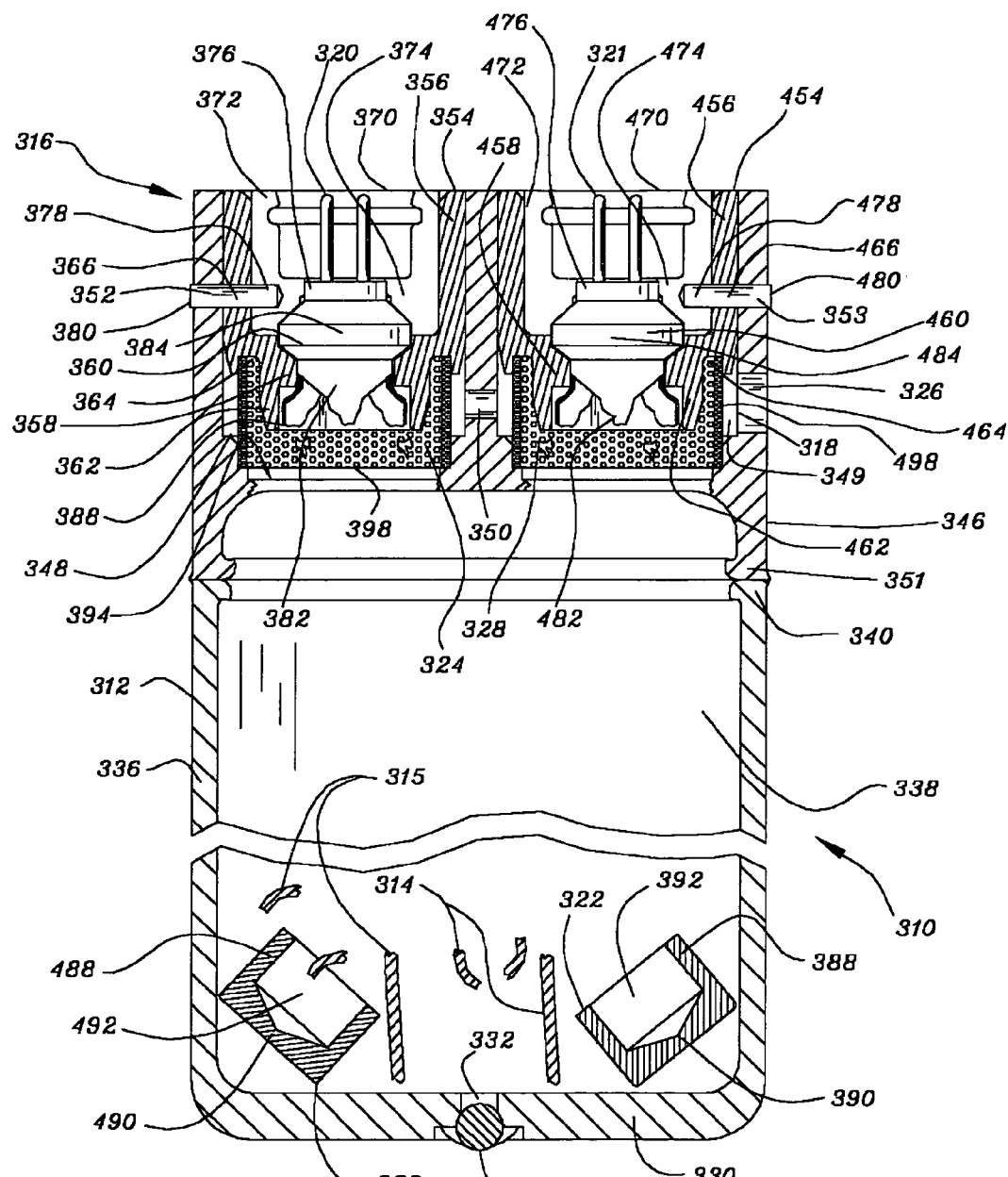
FIG. 8 is a partial sectional view of the embodiment of FIG. 6 in a latter flow stage condition.

Referring now to FIG. 8, when second initiator 321 is activated, second initiator 321 propels second projectile 323 through second closure member 315, out of housing 316, and into vessel 312, thereby breaking second closure member 315 and allowing the compressed gas to escape to main outlet path 326 through a second secondary outlet path 328 in addition to first secondary outlet path 324. The flow of compressed gas into the vehicle restraint is then increased substantially beyond the flow prior to activation of second initiator 321 when the gas could escape only through first secondary outlet path 324.

The initial slow flow of gas, and the later increased flow is safer in that the force of an initial blow to a potential occupant is decreased because of the smaller initial flow of compressed gas. However, the later increased flow is sufficient to timely inflate the vehicle restraint. The advantages to such a flow and the timing of increasing flow are described in U.S. Pat. No. 5,820,162 to Fink, issued Oct. 13, 1998, which is incorporated herein by reference.

Referring back to FIG. 6, and describing inflator 310 in more detail, vessel 312 is preferably a hollow cylindrical member that includes a radial wall 330 that defines a fill hole 332 therein. A weld ball 334 preferably forms a closure or plug of fill hole 332. However, fill hole 332 may be closed or plugged in some other fashion that allows vessel 312 to be filled with pressurized gas and then sealed. A circumferential wall 336 extends upwardly from radial wall 330 to define a chamber 338 therein. An upper terminus 340 of circumferential wall 336 extends inwardly to form an annular flange distal from radial wall 330.

Housing 316 preferably includes an end cap housing 346 that defines a first cylindrical recess 348, a second cylindrical recess 349, and an orifice 350 therebetween. First secondary outlet path 324 extends through first recess 348, through orifice 350 and to second recess 349. Second secondary outlet path 328 extends into second recess 349. First secondary outlet path 324 and second secondary outlet path 328 meet within second recess 349 and main outlet path 326 extends from second recess 349 through outlet 318. A lower annular terminus 351 of end cap housing 346 extends radially inwardly to form an annular flange that abuts upper terminus 340 of vessel 312. Preferably lower terminus 351 abuts upper terminus 340 and is secured thereto by an inertia or friction weld thereby securing vessel 312 to housing 316. Accordingly, chamber 338 extends upwardly within the lower portion of housing 316. However, vessel 312 may be secured to housing 316 in many other ways so long as chamber 338 remains sealed. End cap housing 346 preferably defines an outlet or outlet orifice 318 that extends radially therethrough. End cap housing 346 also defines a first pin hole 352 extending into first recess 348 and a second pin hole 353 extending into second recess 349.

A first projectile housing 354 preferably includes an upper circumferential wall 356 that is seated within first recess 348 of end cap housing 346. A radial wall 358 preferably extends inwardly from a lower terminus of circumferential wall 356 and defines a beveled hole 360 therein. A projectile casing 362 is preferably a circumferential wall that extends from radial wall 358. Projectile housing 354 also defines a downwardly-facing annular groove 364 and a radially extending pin hole 366.

A first initiator retainer 370 is seated within upper circumferential wall 356 of first projectile housing 354. Initiator retainer 370 includes a circumferential wall 372 and a radial wall 374 extending inwardly from a bottom edge of circumferential wall 372. Radial wall 374 defines a centrally located beveled hole 376 therein. Initiator retainer 370 also defines a radially extending pin hole 378 therein.

A first pin 380 extends through first pin hole 352 of end cap housing 346, through pin hole 366 of first projectile housing 354 and into pin hole 378 of first initiator retainer 370. Preferably first pin 380 is sized to produce an interference fit with one or more of pin holes 352, 366, 378.

First initiator 320 is preferably a standard initiator that includes a small pyrotechnic charge housed within a cylindrical body 382. A flange 384 extends radially outwardly from an upper portion of cylindrical body 382. Flange 384 is seated within beveled hole 360 of projectile housing 354 and beveled hole 376 of initiator retainer 370 to secure first initiator 320 within housing 316. First initiator 320 is preferably an initiator of the kind known as "popcorn" or pin style initiators that includes zirconium potassium perchlorate as a pyrotechnic material and that includes a bridge wire that ignites the pyrotechnic material when a current is passed through it.

First projectile 322 preferably includes a circumferential wall 388 that is seated within casing 362. A radial wall 390 extends inwardly from a bottom edge of circumferential wall 388 so that first projectile 322 forms an upwardly facing cavity 392 that receives body 382 of first initiator 320.

First closure member 314 is preferably a radial wall having an upwardly facing first side 394 and a downwardly facing second side 396. First closure member 314 extends radially inwardly to form a bottom closure of first recess 348. First closure member 314 is preferably formed with end cap housing 346 as a unitary member. Radial wall 390 of first projectile 322 preferably abuts first side 394 to support first closure member 314 against the force of pressurized gas within chamber 338. This allows closure member 314 to be thin and it still provides the structural integrity needed to keep the pressurized gas from prematurely breaking closure member 314.

A first annular filter 398 is seated within annular groove 364 of projectile housing 354 and extends downwardly until it abuts a shoulder of end cap housing 346.

A second projectile housing 454 preferably includes an upper circumferential wall 456 that is seated within second recess 349 of end cap housing 346. A radial wall 458 preferably extends inwardly from a lower terminus of circumferential wall 456 and defines a beveled hole 460 therein. A projectile casing 462 is preferably a circumferential wall that extends from radial wall 458. Projectile housing 454 also defines a downwardly-facing annular groove 464 and a radially extending pin hole 466.

A second initiator retainer 470 is seated within upper circumferential wall 456 of second projectile housing 454. Initiator retainer 470 includes a circumferential wall 472 and a radial wall 474 extending inwardly from a bottom edge of circumferential wall 472. Radial wall 474 defines a centrally located beveled hole 476 therein. Initiator retainer 470 also defines a radially extending pin hole 478 therein.

A second pin 480 extends through second pin hole 353 of end cap housing 346, through pin hole 466 of second projectile housing 454 and into pin hole 478 of second initiator retainer 470. Preferably second pin 480 is sized to produce an interference fit with one or more of pin holes 353, 466, 478.

Second initiator 321 is preferably a standard initiator that includes a small pyrotechnic charge housed within a cylindrical body 482. A flange 484 extends radially outwardly from an upper portion of cylindrical body 482. Flange 484 is seated within beveled hole 460 of projectile housing 454 and beveled hole 476 of initiator retainer 470 to secure second initiator 321 within housing 316. Second initiator 321 is preferably an initiator of the kind known as "popcorn" or pin style initiators that includes zirconium potassium perchlorate as a pyrotechnic material and that includes a bridge wire that ignites the pyrotechnic material when a current is passed through it.

Second projectile 323 preferably includes a circumferential wall 488 that is seated within casing 462. A radial wall 490 extends inwardly from a bottom edge of circumferential wall 488 so that second projectile 323 forms an upwardly facing cavity 492 that receives body 482 of second initiator 321.

Second closure member 315 is preferably a radial wall having an upwardly facing first side 494 and a downwardly facing second side 496. Second closure member 315 extends radially inwardly to form a bottom closure of second recess 349. Second closure member 315 is preferably formed with end cap housing 346 as a unitary member. Radial wall 490 of second projectile 323 preferably abuts first side 494 to support second closure member 315 against the force of pressurized gas within chamber 338. This allows closure member 315 to be thin and it still provides the structural integrity needed to keep the pressurized gas from prematurely breaking closure member 315.

A second annular filter 498 is seated within annular groove 464 of projectile housing 454 and extends downwardly until it abuts a shoulder of end cap housing 346.

The components of inflator 310 are preferably made of the same materials and are made by the same manufacturing processes as the corresponding components of inflator 10 discussed above.

In assembling inflator 310, lower terminus 351 of end cap housing 346 is welded to upper terminus 340 of vessel 312. This weld is preferably an inertia or friction weld because such a weld is resistant to leakage.

A first initiator assembly is formed by first pressing first projectile 322 into casing 362 of first projectile housing 354 to preferably form an interference fit. First initiator 320 is then inserted into beveled hole 360 of first projectile housing 354 so that flange 384 is seated within the beveled portion of hole 360, and body 382 extends through hole 360 and into cavity 392 of first projectile 322. First initiator retainer 370 is then pressed within circumferential wall 356 of first projectile housing 354. Preferably, first initiator retainer 370 and first projectile housing 354 form an interference fit. Filter 398 is then positioned in annular groove 364 of first projectile housing 354.

The resulting first initiator assembly is then preferably pressed within first recess 348 of end cap housing 346 until radial wall 390 of first projectile 322 abuts first closure member 314. Pin holes 352, 366, and 378 are preferably then drilled so that they all align. First pin 380 is preferably then pressed into pin holes 352, 366, and 378 to fix end cap housing 346, first projectile housing 354, and first initiator retainer 370 of housing 316 together.

Then, a second initiator assembly is formed by first pressing second projectile 323 into casing 462 of second projectile housing 454 to preferably form an interference fit. Second initiator 321 is then inserted into beveled hole 460 of second projectile housing 454 so that flange 484 is seated within the beveled portion of hole 460, and body 482 extends through hole 460 and into cavity 492 of second projectile 323. Second initiator retainer 470 is then pressed within circumferential wall 356 of second projectile housing 454. Preferably, second initiator retainer 470 and second projectile housing 454 form an interference fit. Filter 498 is then positioned in annular groove 464 of second projectile housing 454.

The resulting second initiator assembly is then preferably pressed within second recess 349 of end cap housing 346 until radial wall 490 of second projectile 323 abuts second closure member 315. Pin holes 353, 466, and 478 are preferably then drilled so that they all align. Second pin 480 is preferably then pressed into pin holes 353, 466, and 478 to fix end cap housing 346, second projectile housing 454, and second initiator retainer 470 of housing 316 together.

Chamber 338 is preferably then filled with a pressurized gas through fill hole 332 in vessel 312. The gas is preferably helium, but it may be any of several other types of gas. After chamber 338 is filled, weld ball 334 is positioned in fill hole 332 and is welded therein preferably by a resistance weld. Inflator 310 is then positioned within a module and outlet 318 is fluidly connected to an inflatable safety device such as an air bag. Initiators 320, 321 are connected to the control for the safety device so that initiators 320, 321 will be timely activated by the control for the safety device.

Referring to FIG. 7, when first initiator 320 is activated, body 382 bursts and propels first projectile 322 through first closure member 314. Preferably, circumferential wall 388 of first projectile 322 remains within casing 362 so that first projectile 322 acts as a piston until first projectile 322 breaks through first closure member 314. First projectile 322 and fragments from first closure member 314 and body 382 of first initiator 320 are propelled into chamber 338. With first closure member 314 broken, pressurized gas within chamber 338 is allowed to escape along first secondary outlet path 324 and main outlet path 326 and through outlet 318. The gas will then begin to inflate the inflatable safety device. Filter 398 prevents projectile 322 and fragments from closure member 314 and body 382 from escaping through outlet 318 along first secondary outlet path 324.

Referring to FIG. 8, after first initiator 320 is activated, second initiator 321 is activated. The time between activation of first initiator 320 and activation of second initiator 321 may be a set predetermined time or it may be a variable time that will depend on factors, such as the characteristics of the vehicle occupants and the nature of the vehicle collision. When second initiator 321 is activated, body 482 bursts and propels second projectile 323 through second closure member 315. Preferably, circumferential wall 488 of second projectile 323 remains within casing 462 so that second projectile 323 acts as a piston until second projectile 323 breaks through second closure member 315. Second projectile 323 and fragments from second closure member 315 and body 482 of second initiator 321 are propelled into chamber 338. With second closure member 315 broken, pressurized gas within chamber 338 is allowed to escape along first secondary outlet path 324 and second secondary outlet path 328 to main outlet path 326, and along main outlet path 326 and through outlet 318. The gas will then finish inflating the inflatable safety device. Filter 498 prevents projectiles 322, 323 and fragments from closure members 314, 315 and bodies 382, 482 from escaping through outlet 318 along second secondary outlet path 328.

Figure 9:
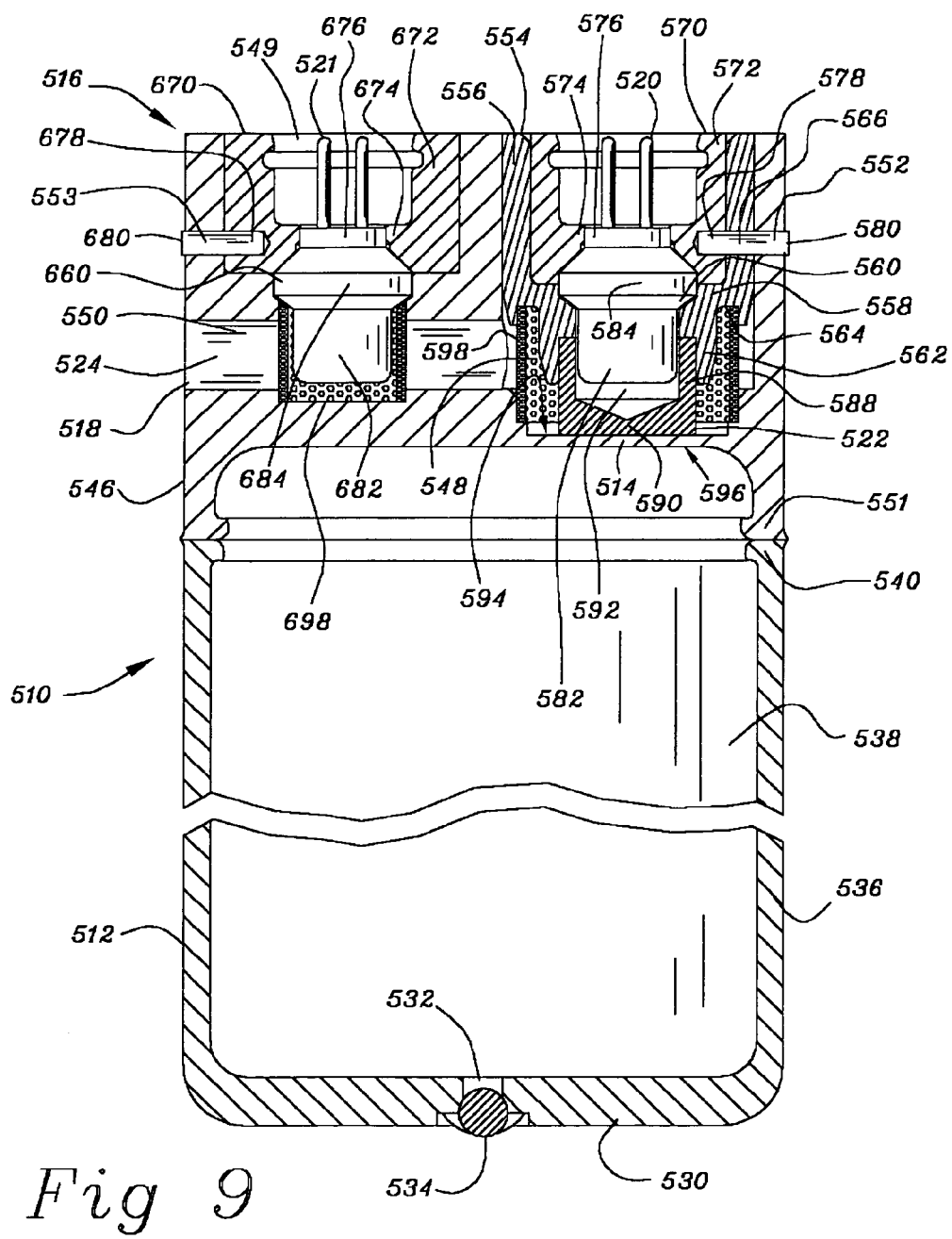
FIG. 9 is a partial sectional view of an embodiment of the present invention in an unactivated condition.

Referring now to FIG. 9, a pressurized container or inflator 510 generally includes a vessel 512 that houses compressed gas, such as helium. A closure member 514 forms a closure of vessel 512. A housing 516 is attached to vessel 512 and defines an outlet 518 therein that is preferably fluidly separated from the compressed gas only by closure member 514. Housing 516 houses a first initiator 520, a projectile 522 that abuts closure member 514 on a side opposite from the compressed gas, and a second initiator 521 that protrudes into an outlet path 524 and forms an obstruction therein partially blocking outlet path 524.

Figure 10:
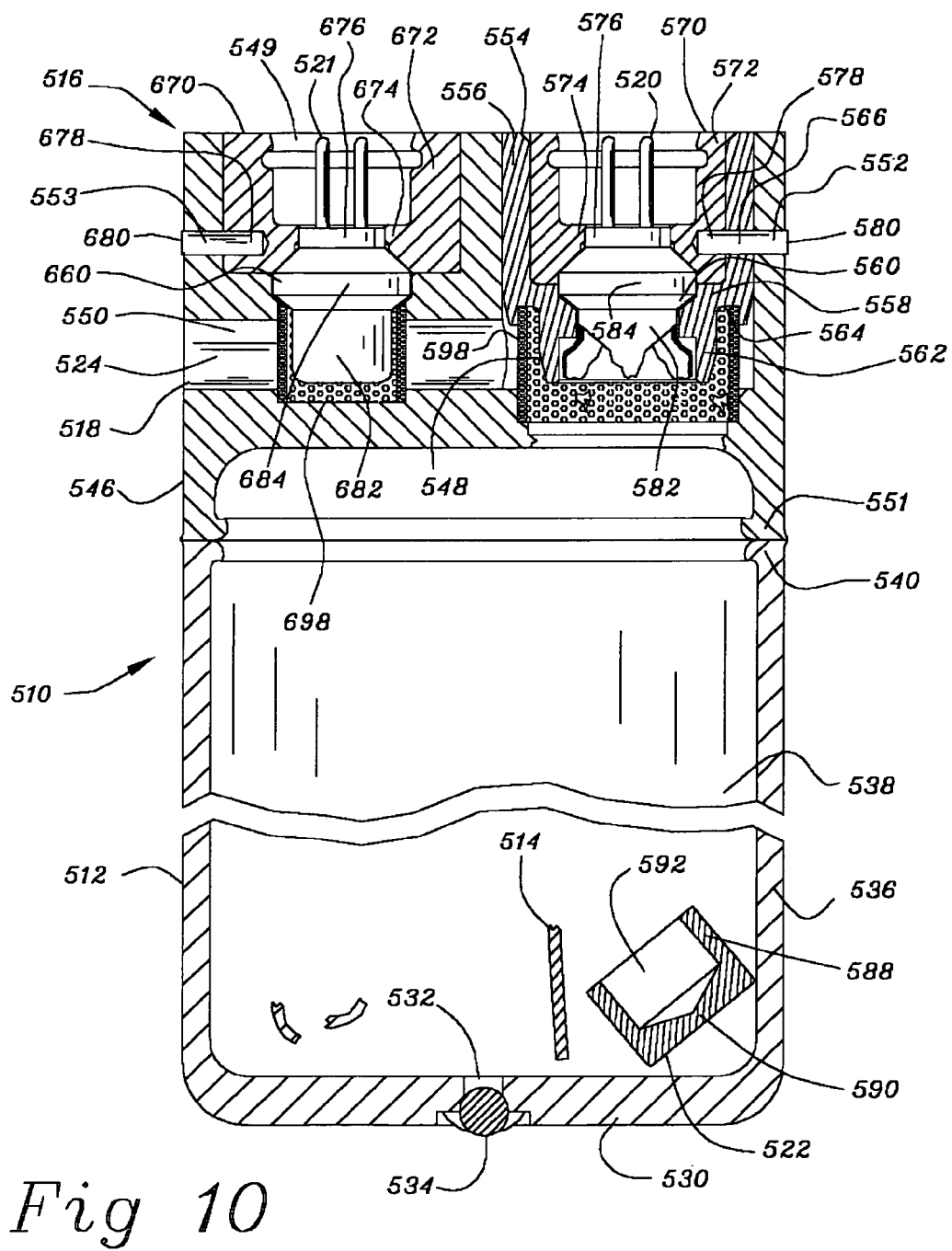
FIG. 10 is a partial sectional view of the embodiment of FIG. 9 in an initial flow stage condition.

Referring now to FIG. 10, when first initiator 520 is activated, first initiator 520 propels first projectile 522 through first closure member 514, out of housing 516, and into vessel 512, thereby breaking first closure member 514 and allowing the compressed gas to escape through a first secondary outlet path 524, through a main outlet path 526, and though outlet 518. The compressed gas begins to inflate a vehicle restraint such as an air bag (not shown).

Figure 11:
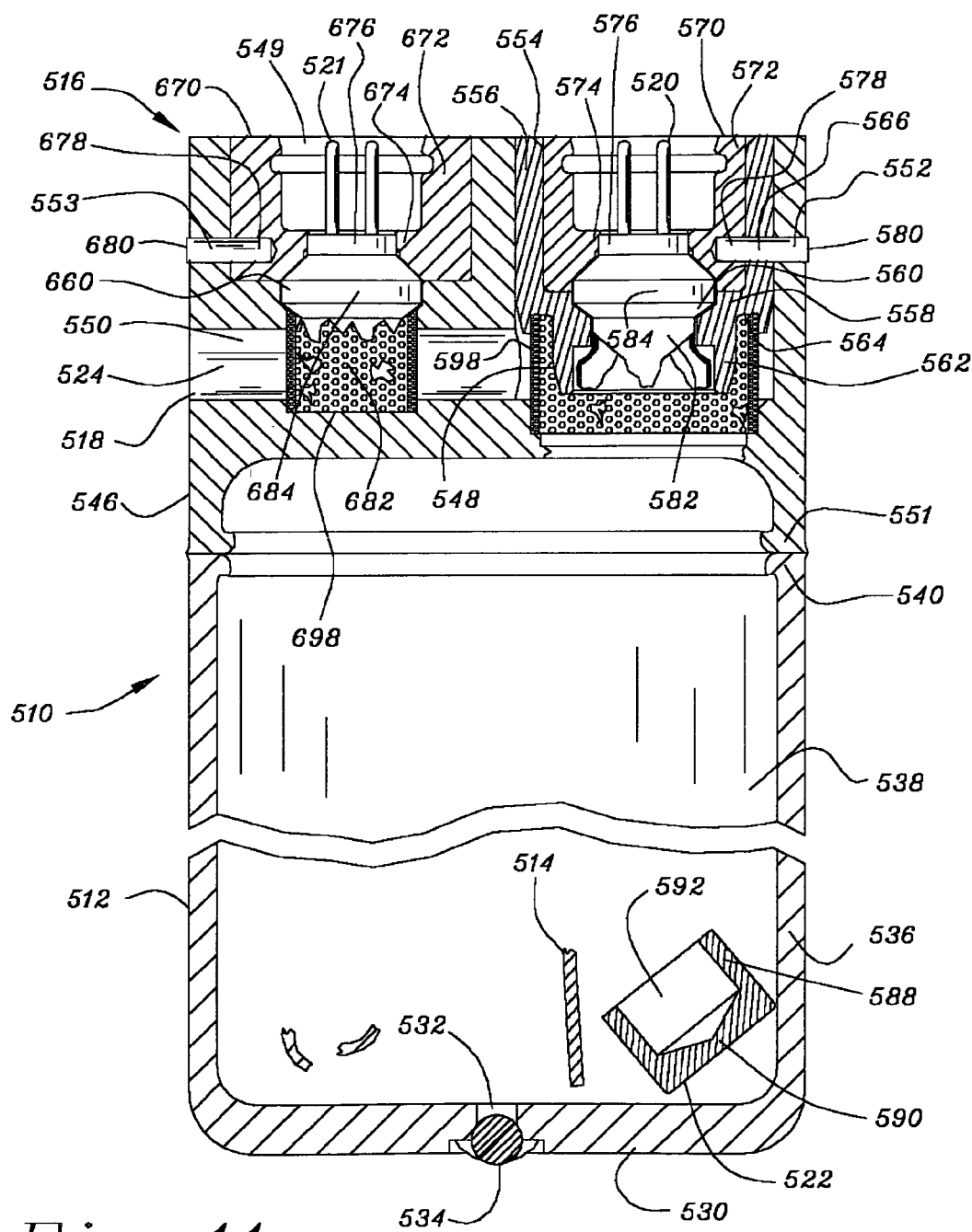
FIG. 11 is a partial sectional view of the embodiment of FIG. 9 in a latter flow stage condition.

Referring now to FIG. 11, when second initiator 521 is activated, second initiator 521 breaks or bursts, thereby removing the obstruction from outlet path 526 and allowing the compressed gas to escape substantially unobstructed through outlet path 526. The flow of compressed gas into the vehicle restraint is then increased substantially beyond the flow prior to activation of second initiator 521 when outlet path 526 was partially blocked. As discussed above, the initial slow flow of gas, and the later increased flow is safer in that the force of an initial blow to a potential occupant is decreased because of the smaller initial flow of compressed gas. However, the later increased flow is sufficient to timely inflate the vehicle restraint.

Referring back to FIG. 9, and describing inflator 510 in more detail, vessel 512 is preferably a hollow cylindrical member that includes a radial wall 530 that defines a fill hole 532 therein. A weld ball 534 preferably forms a closure or plug of fill hole 532. However, fill hole 532 may be closed or plugged in some other fashion that allows vessel 512 to be filled with pressurized gas and then sealed. A circumferential wall 536 extends upwardly from radial wall 530 to define a chamber 538 therein. An upper terminus 540 of circumferential wall 536 extends inwardly to form an annular flange distal from radial wall 530.

Housing 516 preferably includes an end cap housing 546 that defines a first cylindrical recess 548, a second cylindrical recess 549, and an outlet conduit 550 extending from first cylindrical recess 548 to outlet 518. Thus, outlet path 524 extends through first recess 548, through outlet conduit 550 and to outlet 518. A lower annular terminus 551 of end cap housing 546 extends radially inwardly to form an annular flange that abuts upper terminus 540 of vessel 512. Preferably lower terminus 551 abuts upper terminus 540 and is secured thereto by an inertia or friction weld thereby securing vessel 512 to housing 516. Accordingly, chamber 538 extends upwardly within the lower portion of housing 516. However, vessel 512 may be secured to housing 516 in many other ways so long as chamber 538 remains sealed. End cap housing 546 preferably defines a first pin hole 552 extending into first recess 548 and a second pin hole 553 extending into second recess 549.

A projectile housing 554 preferably includes an upper circumferential wall 556 that is seated within first recess 548 of end cap housing 546. A radial wall 558 preferably extends inwardly from a lower terminus of circumferential wall 556 and defines a beveled hole 560 therein. A projectile casing 562 is preferably a circumferential wall that extends from radial wall 558. Projectile housing 554 also defines a downwardly-facing annular groove 564 and a radially extending pin hole 566.

A first initiator retainer 570 is seated within upper circumferential wall 556 of projectile housing 554. First initiator retainer 570 includes a circumferential wall 572 and a radial wall 574 extending inwardly from a bottom edge of circumferential wall 572. Radial wall 574 defines a centrally located beveled hole 576 therein. First initiator retainer 570 also defines a radially extending pin hole 578 therein.

A first pin 580 extends through first pin hole 552 of end cap housing 546, through pin hole 566 of projectile housing 554 and into pin hole 578 of first initiator retainer 570. Preferably second pin 580 is sized to produce an interference fit with one or more of pin holes 552, 566, and 578.

First initiator 520 is preferably a standard initiator that includes a small pyrotechnic charge housed within a cylindrical body 582. A flange 584 extends radially outwardly from an upper portion of cylindrical body 582. Flange 584 is seated within beveled hole 560 of projectile housing 554 and beveled hole 576 of first initiator retainer 570 to secure first initiator 520 within housing 516. First initiator 521 is preferably an initiator of the kind known as "popcorn" or pin style initiators that includes zirconium potassium perchlorate as a pyrotechnic material and that includes a bridge wire that ignites the pyrotechnic material when a current is passed through it.

Projectile 522 preferably includes a circumferential wall 588 that is seated within casing 562. A radial wall 590 extends inwardly from a bottom edge of circumferential wall 588 so that projectile 522 forms an upwardly facing cavity 592 that receives body 582 of first initiator 520.

Closure member 514 is preferably a radial wall having an upwardly facing first side 594 and a downwardly facing second side 596. Closure member 514 extends radially inwardly to form a bottom closure of first recess 548. Closure member 514 is preferably formed with end cap housing 546 as a unitary member. Radial wall 590 of projectile 522 preferably abuts first side 594 to support closure member 514 against the force of pressurized gas within chamber 538. This allows closure member 514 to be thin and it still provides the structural integrity needed to keep the pressurized gas from prematurely breaking closure member 514.

An annular filter 598 is seated within annular groove 564 of projectile housing 554 and extends downwardly until it abuts a shoulder of end cap housing 546.

Housing 516 defines a beveled hole 660 extending between second recess 549 and outlet conduit 550. A second initiator retainer 670 is seated within second recess 549. Second initiator retainer 670 includes a circumferential wall 672 and a radial wall 674 extending inwardly from a bottom edge of circumferential wall 672. Radial wall 674 defines a centrally located beveled hole 676 therein. Second initiator retainer 670 also defines a radially extending pin hole 678 therein that is aligned with second pin hole 553 of end cap housing 546. A second pin 680 extends through second pin hole 553 in end cap housing 546 and into pin hole 678 in second initiator retainer 670, preferably forming an interference fit.

Second initiator 521 is preferably a standard initiator that includes a small pyrotechnic charge housed within a cylindrical body 682. A flange 684 extends radially outwardly from an upper portion of cylindrical body 682. Flange 684 is seated within beveled hole 660 of end cap housing 546 and beveled hole 676 of second initiator retainer 670 to secure second initiator 521 within housing 516. Body 682 extends into outlet conduit 550 to form a partial blockage of outlet path 524. Second initiator 521 is preferably an initiator of the kind known as "popcorn" or pin style initiators that includes zirconium potassium perchlorate as a pyrotechnic material and that includes a bridge wire that ignites the pyrotechnic material when a current is passed through it. Also, body 682 of second initiator 521 may include an outer reinforcing sleeve to prevent premature breakage of body 682 due to the force of air flow before second initiator 521 is activated.

An annular filter 698 preferably spans outlet conduit 550 and surrounds body 682 of second initiator 521.

The components of inflator 510 are preferably made of the same materials and are made by the same manufacturing processes as the corresponding components of inflator 10 discussed above.

In assembling inflator 510, lower terminus 551 of end cap housing 546 is welded to upper terminus 540 of vessel 512. This weld is preferably an inertia or friction weld because such a weld is resistant to leakage.

A first initiator assembly is formed by first pressing first projectile 522 into casing 562 of projectile housing 554 to preferably form an interference fit. First initiator 520 is then inserted into beveled hole 560 of second projectile housing 554 so that flange 584 is seated within the beveled portion of hole 560, and body 582 extends through hole 560 and into cavity 592 of projectile 522. First initiator retainer 570 is then pressed within circumferential wall 556 of projectile housing 554. Preferably, first initiator retainer 570 and projectile housing 554 form an interference fit. Filter 598 is then positioned in annular groove 564 of projectile housing 554.

The resulting first initiator assembly is then preferably pressed within first recess 548 of end cap housing 546 until radial wall 590 of projectile 522 abuts closure member 514. Pin holes 552, 566, and 578 are preferably then drilled so that they all align. First pin 580 is preferably then pressed into pin holes 552, 566, and 578 to fix end cap housing 546, projectile housing 554, and first initiator retainer 570 of housing 516 together.

Filter 698 is inserted through hole 660 so that it spans conduit 550. Second initiator 521 is preferably then seated within beveled hole 660 of end cap housing 546 and second initiator retainer 670 is pressed into second recess 549 of end cap housing 546. Second pin 680 is preferably then pressed into second pin hole 553 of end cap housing 546 and into pin hole 678 of second initiator retainer 670.

Chamber 538 is preferably then filled with a pressurized gas through fill hole 532 in vessel 512. The gas is preferably helium, but it may be any of several other types of gas. After chamber 538 is filled, weld ball 534 is positioned in fill hole 532 and is welded therein preferably by a resistance weld. Inflator 510 is then positioned within a module and outlet 518 is fluidly connected to an inflatable safety device such as an air bag. Initiators 520, 521 are connected to the control for the safety device so that initiators 520, 521 will be timely activated by the control for the safety device.

Referring to FIG. 10, when first initiator 520 is activated, body 582 bursts and propels projectile 522 through closure member 514. Preferably, circumferential wall 588 of projectile 522 remains within casing 562 so that projectile 522 acts as a piston until projectile 522 breaks through closure member 514. Projectile 522 and fragments from first closure member 514 and body 582 of first initiator 520 are propelled into chamber 538. With first closure member 514 broken, pressurized gas within chamber 538 is allowed to escape along outlet path 524 and through outlet 518. The gas will then begin to inflate the inflatable safety device.

Referring to FIG. 11, after first initiator 520 is activated, second initiator 521 is activated. The time between activation of first initiator 520 and activation of second initiator 521 may be a set predetermined time or it may be a variable time that will depend on factors, such as the characteristics of the vehicle occupants and the nature of the vehicle collision. When second initiator 521 is activated, body 682 bursts, thereby substantially removing the obstruction in outlet path 524. With obstruction or body 682 broken, pressurized gas within chamber 538 is allowed to escape along outlet path 524 and through outlet 518 without being partially blocked. The gas will then finish inflating the inflatable safety device. Filter 698 prevents fragments of body 682 from escaping through outlet 518.

Figure 12:
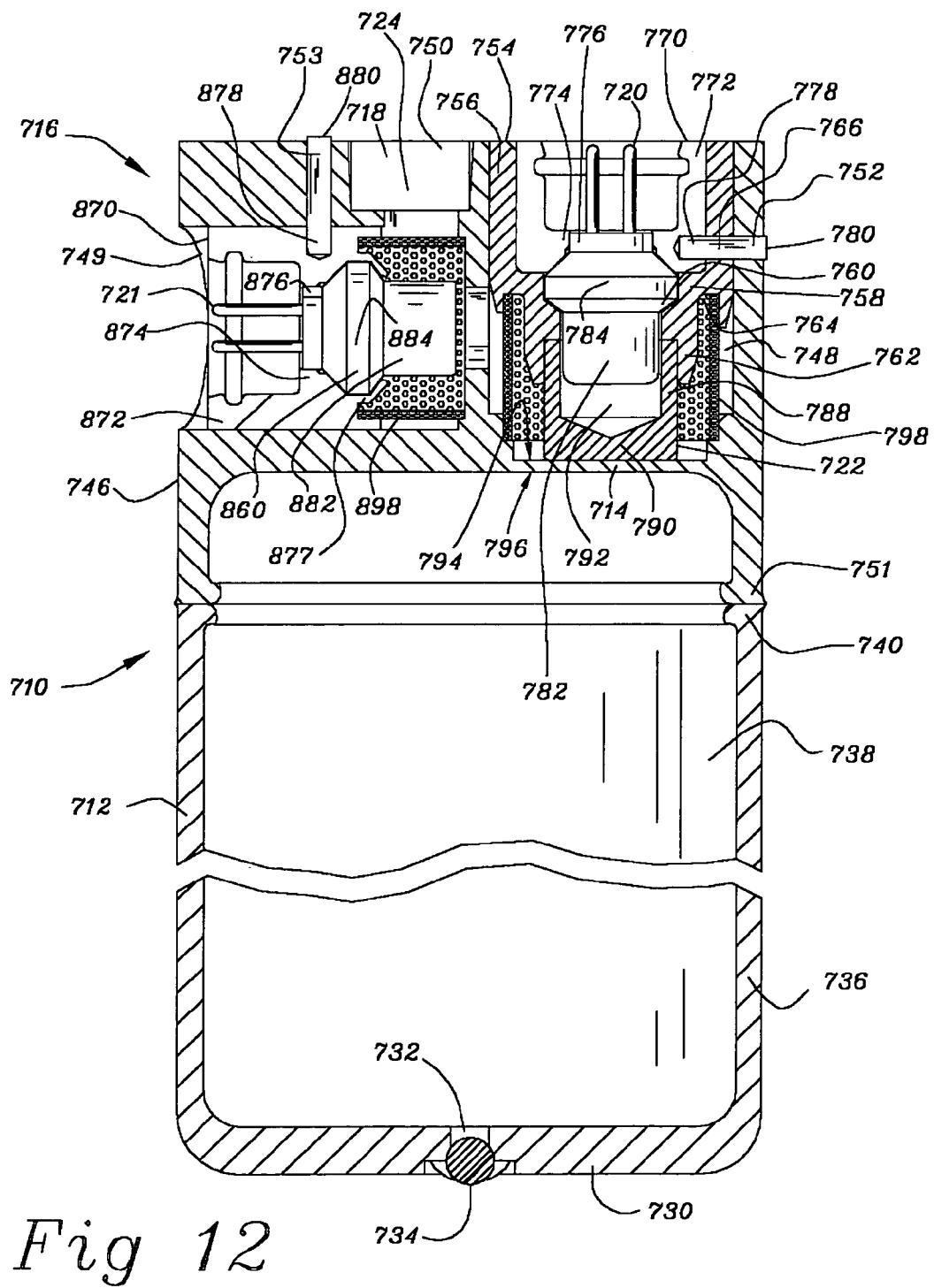
FIG. 12 is a partial sectional view of an embodiment of the present invention in an unactivated condition.

Referring now to FIG. 12, an alternative inflator 710 is shown that is similar in structure and function to the inflator 510 discussed above. The last two digits of reference numbers for features in FIG. 12 that correspond to features discussed above with reference to FIGS. 9–11 have the same last two digits. In the embodiment shown in FIG. 12, the outlet conduit 750 extends upwardly so that outlet 718 is defined in the top of end cap housing 746, rather than in the side as in FIGS. 9–11. Thus, second recess 749 extends inwardly from the side of end cap housing 746 and second pin 880 extends downwardly from the top of end cap housing 746. Also, a circumferential wall 877 extends from radial wall 874 and is crimped to engage flange 884 of second initiator 721. Otherwise, the embodiment shown in FIG. 12 is the same as the embodiment of FIGS. 9–11 in structure and function.

Figure 13:
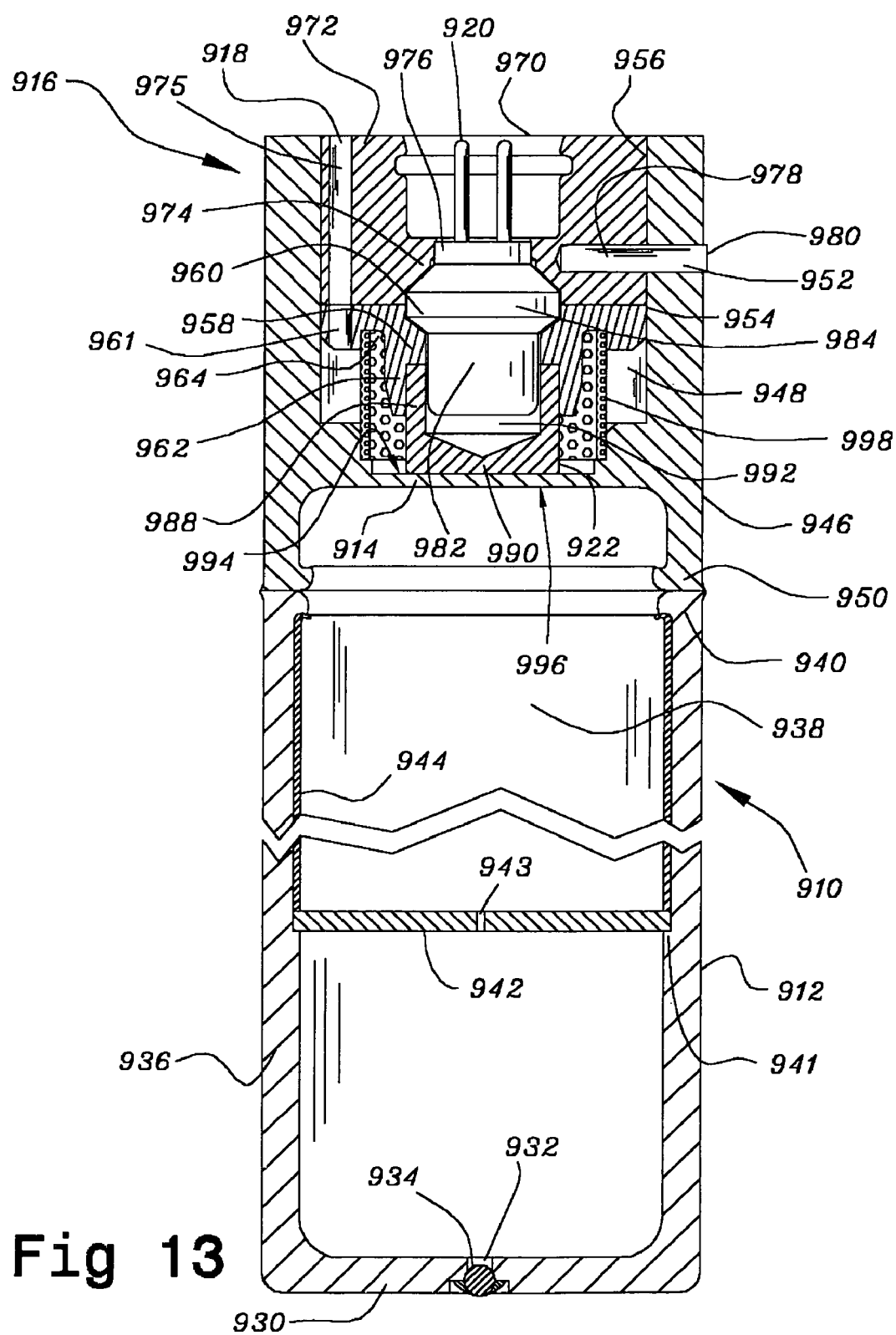
FIG. 13 is a partial sectional view of an embodiment of the present invention in an unactivated condition.

Referring to FIG. 13, a pressurized container or inflator 910 generally includes a vessel 912 that houses compressed gas, such as helium. A closure member 914 forms a closure of the vessel 912. A housing 916 is attached to vessel 912 and defines an outlet 918 therein that is preferably fluidly separated from the compressed gas only by closure member 914. Housing 916 houses an initiator 920 and a projectile 922 that abuts closure member 914 on a side opposite from the compressed gas. When initiator 920 is activated, inflator 910 operates similarly to inflator 10 above, with some exceptions described below.

Referring still to FIG. 13, and describing inflator 910 in more detail, vessel 912 is preferably a hollow cylindrical member that includes a radial wall 930 that defines a fill hole 932 therein. A weld ball 934 preferably forms a closure or plug of fill hole 932. However, fill hole 932 may be closed or plugged in some other fashion that allows vessel 912 to be filled with pressurized gas and sealed. A circumferential wall 936 extends upwardly from radial wall 930 to define a chamber 938 therein. An upper terminus 940 of circumferential wall 936 extends inwardly to form an annular flange distal from radial wall 930. Circumferential wall 936 also defines an annular upwardly-facing shoulder 941 between radial wall 930 and upper terminus 940 that supports an isolator member or isolator plate 942 thereon. Isolator plate 942 defines a centrally-located passage or bleed orifice 943 therein that fluidly connects an upper portion of chamber 938 from a lower portion of chamber 938. Passage 943 can be any form of fluid communication between the two portions of chamber 938. For example, it could be a clearance about the periphery of isolator plate 942. A retainer sleeve or circumferential wall 944 abuts the upper periphery of isolator plate 942 and extends upwardly to abut the annular flange of upper terminus 940 of circumferential wall 936.

Housing 916 preferably includes an end cap housing 946 that is primarily a circumferential wall 948 that includes a lower terminus 950 that extends inwardly to form an annular flange that abuts upper terminus 940 of vessel 912. Preferably lower terminus 950 abuts upper terminus 940 and is secured thereto by an inertia weld or a friction weld thereby securing vessel 912 to housing 916. Accordingly, the upper portion of chamber 938 extends upwardly within the lower portion of housing 916. However, vessel 912 may be secured to housing 916 in many other ways so long as chamber 938 remains sealed. End cap housing 946 defines a pin hole 952 extending radially therethrough.

A projectile housing 954 preferably includes a radial wall 958 that defines a beveled hole 960 therein. Radial wall 958 preferably also defines an outlet hole 961 therein that forms part of outlet 918. A projectile casing 962 is preferably a circumferential wall that extends from radial wall 958. Projectile housing 954 also defines a downwardly-facing annular groove 964.

An initiator retainer 970 is seated within circumferential wall 948 of end cap housing 946. Initiator retainer 970 includes a circumferential wall 972 and a radial wall 974 extending inwardly from a bottom edge of circumferential wall 972. Initiator retainer 970 defines an outlet hole 975 that is aligned with outlet hole 961 of projectile housing 954 and that extends upwardly to form part of outlet 918. Radial wall 974 also defines a centrally located beveled hole 976 therein. Initiator retainer 970 defines a radially extending pin hole 978 therein.

A pin 980 extends through pin hole 952 of end cap housing 946 and into pin hole 978 of initiator retainer 970. Preferably pin 980 is sized to produce an interference fit with one or more of pin holes 952 and 978.

Initiator 920 is preferably a standard initiator that includes a small pyrotechnic charge housed within a cylindrical body 982. A flange 984 extends radially outwardly from an upper portion of cylindrical body 982. Flange 984 is seated within beveled hole 960 of projectile housing 954 and beveled hole 976 of initiator retainer 970 to secure initiator 920 within housing 916. Initiator 920 is preferably an initiator of the kind known as "popcorn" or pin style initiators that includes zirconium potassium perchlorate as a pyrotechnic material and that includes a bridge wire that ignites the pyrotechnic material when a current is passed through it.

Projectile 922 preferably includes a circumferential wall 988 that is seated within casing 962. However, the casing and the projectile may be some other structure. For example, the casing may extend within the circumferential wall of the projectile. A radial wall 990 extends inwardly from a bottom edge of circumferential wall 988 so that projectile 922 forms an upwardly facing cavity 992 that receives body 982 of initiator 920.

Closure member 914 is preferably a radial wall having an upwardly facing first side 994 and a downwardly facing second side 996. Closure member 914 extends inwardly from end cap housing 946 and is preferably formed with end cap housing 946 as a unitary member. Radial wall 990 of projectile 922 preferably abuts first side 994 to support closure member 914 against the force of pressurized gas within chamber 938. This allows closure member 914 to be thin and it still provides the structural integrity needed to keep the pressurized gas from prematurely breaking closure member 914.

An annular filter 998 is seated within annular groove 964 of projectile housing 954 and extends downwardly until it abuts a shoulder of end cap housing 946.

The components of inflator 910 are preferably made from the same materials and by the same processes as corresponding components of inflator 10 discussed above. Isolator plate 942 and retainer sleeve 944 are preferably both made of aluminum, such as 6061-T6 aluminum.

In assembling inflator 910, isolator plate 942 and retainer sleeve are placed within vessel 912 and lower terminus 950 of end cap housing 946 is welded to upper terminus 940 of vessel 912. This weld is preferably an inertia weld or a friction weld because such a welds are resistant to leakage. The inertia or friction weld creates the inwardly extending annular flanges of lower terminus 950 of end cap housing 946 and the upper terminus 940 of vessel 912. The inwardly extending flange of upper terminus 940 holds retainer sleeve 944 in place, and retainer sleeve 944 holds isolator plate 942 in place.

Then, an initiator assembly is formed by first pressing projectile 922 into casing 962 of projectile housing 954 to preferably form an interference fit. Initiator 920 is then inserted into beveled hole 960 of projectile housing 954 so that flange 984 is seated within the beveled portion of hole 960 and body 982 extends through hole 960 and into cavity 992 of projectile 922. Filter 998 is then positioned in annular groove 964 of projectile housing 954. The resulting assembly is then preferably placed within circumferential wall 948 of end cap housing 946. Initiator retainer 970 is then pressed within circumferential wall 948 of end cap housing 946. Preferably, initiator retainer 970 and circumferential wall 948 form an interference fit, although projectile housing 954 need not form an interference fit with circumferential wall 948. Pin holes 952 and 978 are preferably then drilled so that they align and outlet holes 961 and 975 are drilled so that they align. Pin 980 is preferably then pressed into pin holes 952 and 978 to fix end cap housing 946 and initiator retainer 970 of housing 916 together.

Chamber 938 is preferably then filled with a pressurized gas through fill hole 932 in vessel 912. The gas is preferably a mixture of helium and carbon dioxide because the larger carbon dioxide molecules will bleed more slowly through bleed orifice 943, while the smaller helium molecules quickly escapes from the upper portion of chamber 938. Any of several other types of gas or mixtures of gases may work. For example, helium may be mixed with some other gas having larger molecules, such as argon. Also, it may be desirable to mix helium and carbon dioxide in other inflator applications where it is desirable to have part of the gas escape quickly and part of the gas escape slowly.

After chamber 938 is filled, weld ball 934 is positioned in fill hole 932 and is welded therein preferably by a resistance weld. Inflator 910 is then positioned within a module and outlet 918 is fluidly connected to an inflatable safety device such as an air bag. Initiator 920 is connected to the control for the safety device so that initiator 920 will be timely activated by the control for the safety device.

When initiator 920 is activated, body 982 bursts and creates pressure within cavity 992, which propels projectile 922 through closure member 914. Preferably, circumferential wall 988 of projectile 922 remains within casing 962 so that projectile 922 acts as a piston until projectile 922 breaks through closure member 914. Projectile 922 and fragments from closure member 914 and body 982 are propelled into chamber 938. With closure member 914 broken, pressurized gas within the upper portion of chamber 938 is allowed to quickly escape along an outlet path through filter 998 and through outlet 918. The gas will then inflate the inflatable safety device. After the upper portion of chamber 938 is substantially emptied, gas will continue to slowly escape through bleed orifice 943 and out outlet 918 to keep the inflatable safety device inflated for a longer period of time than would occur with inflator 10. This is preferable in inflatable safety devices such as rollover protection air bags where the safety device needs to stay inflated over a period of time. Filter 998 prevents projectile 922 and fragments from closure member 914 and body 982 from escaping through outlet 918 during inflation of the safety device. The depth of isolator plate 942 can be adjusted to meet different requirements of prolonged safety device inflation.

While the invention has been particularly shown and described with reference to preferred embodiments thereof, it will be understood by those skilled in the art that various changes in form and details may be made therein without departing from the spirit and scope of the invention. For example, individual features from each of the several embodiments described can be used with other features from other embodiments.

The invention claimed is:

1. A method of inflating an air bag using an air bag inflator, the method comprising:

providing a first volume of gas comprising mainly helium;

providing a second volume of gas comprising at least helium and a second gas different from helium;

inflating an air bag associated with the first volume of gas to its substantially full volume with at least a portion of the gas from the first volume of gas;

substantially maintaining the substantially full volume inflation of the air bag for a time with at least a portion of the gas from the second volume of gas also associated with the air bag.

2. The method of claim 1, wherein the air bag inflator is a cold gas inflator.

3. The method of claim 1, wherein the first and second volumes are in fluid communication prior to inflating the air bag.

4. The method of claim 1, wherein the second volume of gas also comprises mainly helium.

5. The method of claim 1, wherein the first volume of gas is expelled from the inflator at a first rate to inflate the air bag, the helium within the second volume of gas is expelled from the inflator at a second rate slower than the first rate, and the second gas within the second volume of gas is expelled from the inflator at a third rate slower than the second rate.

6. The method of claim 1, wherein the first volume of gas and the second volume of gas are expelled from the inflator into the airbag through the same outlet.

7. The method of claim 1, wherein the second gas is argon.

8. The method of claim 1, wherein the first volume of gas and the second volume of gas are within a common vessel in the inflator and separated by an isolator.

9. The method of claim 1, further comprising releasing the gases within both the first and second volumes with only a single initiator.

10. The method of claim 1, wherein the first volume of gas and the second volume of gas each comprise substantially the same gas mixture.

11. A method of inflating an air bag using a cold gas inflator, the method comprising:
   providing a cold gas inflator having a first volume containing at least one pressurized gas, and a second volume containing a gas mixture having at least a first pressurized gas and a second pressurized gas different from the first pressurized gas;
   inflating an air bag associated with the cold gas inflator to its substantially full volume with unheated gas stored within the first volume;
   substantially maintaining the substantially full volume inflation of the air bag for a time with the first and second different pressurized unheated gases stored within the second volume.

12. The method of claim 11, wherein the airbag is initially inflated by releasing the gas contained within the first volume from the cold gas inflator at a first flow rate, and the volume inflation is substantially maintained by releasing the first pressurized gas contained within the second volume from the cold gas inflator at a second flow rate different from the first flow rate, and by releasing the second pressurized gas contained within the second volume from the cold gas inflator at a third flow rate different from the first and second flow rates.

13. The method of claim 11, wherein the first gas of the second volume has a molecule size smaller than the second gas of the second volume.

14. The method of claim 13, wherein the first gas of the second volume is helium and the second gas of the second volume is argon.

15. The method of claim 11, wherein the at least one pressurized gas stored within the first volume is mainly helium.

16. The method of claim 11, wherein the first volume of gas and the second volume of gas are expelled from the inflator into the airbag through the same outlet.

17. The method of claim 11, wherein the first and second volumes are in fluid communication prior to inflating the air bag.

18. The method of claim 11, wherein the first volume of gas further comprises argon.

19. The method of claim 11, wherein the first volume of gas and the second volume of gas are within a common vessel in the cold gas inflator and separated by an isolator.

20. The method of claim 11, further comprising releasing the gases within both the first and second volumes with only a single initiator.

21. The method of claim 11, wherein the first volume of gas and the second volume of gas each comprise substantially the same gas mixture.

22. A method of inflating an air bag using a cold gas inflator, the method comprising:
   inflating an air bag to substantially its full volume from a first gas mixture comprising mainly helium stored in a first volume of a cold gas inflator; and
   substantially maintaining the full volume inflation of the air bag for a time from a second gas mixture stored within a second volume, the second gas mixture comprising helium and argon.

23. The method of claim 22, wherein the airbag is initially inflated by releasing the gas contained within the first volume from the cold gas inflator at a first flow rate, and the volume inflation is substantially maintained by releasing the first pressurized gas contained within the second volume from the cold gas inflator at a second flow rate different from the first flow rate, and by releasing the second pressurized gas contained within the second volume from the cold gas inflator at a third flow rate different from the first and second flow rates.

24. The method of claim 22, wherein the first volume of gas and the second volume of gas are expelled from the inflator into the airbag through the same outlet.

25. The method of claim 22, wherein the first and second volumes are in fluid communication prior to inflating the air bag.

26. The method of claim 22, wherein the full inflation of the air bag is maintained by the gas stored within the second volume by passing it through the first volume for a time longer than the air bag would have been maintained from the gas stored only within the first volume.

27. The method of claim 22, further comprising releasing the gases within both the first and second volumes with only a single initiator.

28. The method of claim 22, wherein the first volume of gas and the second volume of gas are within a common vessel in the cold gas inflator and separated by an isolator.

29. The method of claim 22, wherein the first volume of gas and the second volume of gas each comprise substantially the same gas mixture.

30. A method of inflating an air bag using an air bag inflator, the method comprising:
   providing a first volume of gas comprising mainly helium;
   providing a second volume of gas comprising at least a gas that is different from helium;
   inflating an air bag associated with the first volume of gas to its substantially full volume with at least a portion of the gas from the first volume of gas;

substantially maintaining the substantially full volume inflation of the air bag for a time with at least a portion of the gas from the second volume of gas also associated with the air bag.

31. The method of claim 30, wherein the air bag inflator is a cold gas inflator.

32. The method of claim 30, wherein the first and second volumes are in fluid communication prior to inflating the air bag.

33. The method of claim 30, wherein the second volume of gas further comprises helium and the second volume of gas is mainly helium.

34. The method of claim 33, wherein the helium within the first volume of gas is expelled from the inflator at a first rate to inflate the air bag, the helium within the second volume of gas is expelled from the inflator at a second rate slower than the first rate, and the gas different from helium within the second volume of gas is expelled from the inflator at a third rate slower than the first rate.

35. The method of claim 30, wherein the gas within the first volume of gas is expelled from the inflator at a first rate to inflate the air bag and the gas within the second volume of gas is expelled from the inflator at a second rate slower than the first rate.

36. The method of claim 30, wherein the first volume of gas and the second volume of gas are expelled from the inflator into the airbag through the same outlet.

37. The method of claim 30, wherein the gas that is different from helium has a molecule size larger than helium.

38. The method of claim 37, wherein the gas that is different from helium in the second volume comprises mainly argon.

39. The method of claim 30, wherein the first volume of gas and the second volume of gas are within a common vessel in the inflator and separated by an isolator.

40. The method of claim 30, wherein the first volume of gas and the second volume of gas each comprise substantially the same gas mixture.

* * * * *